United States Patent
Jackman

(10) Patent No.: US 10,668,560 B2
(45) Date of Patent: Jun. 2, 2020

(54) APPARATUS FOR FORMING A FRICTION WELD

(71) Applicant: Jackweld Limited, Shepperton, Surrey (GB)

(72) Inventor: Stuart Jackman, Surbiton (GB)

(73) Assignee: JACKWELD LIMITED, Shepperton, Surrey (GB)

(*) Notice: Subject to any disclaimer, the term of this patent is extended or adjusted under 35 U.S.C. 154(b) by 0 days.

(21) Appl. No.: 15/779,806

(22) PCT Filed: Nov. 30, 2016

(86) PCT No.: PCT/GB2016/053759
§ 371 (c)(1),
(2) Date: May 29, 2018

(87) PCT Pub. No.: WO2017/093726
PCT Pub. Date: Jun. 8, 2017

(65) Prior Publication Data
US 2019/0099831 A1    Apr. 4, 2019

(30) Foreign Application Priority Data

Nov. 30, 2015 (GB) .................................. 1521079.2

(51) Int. Cl.
*B23K 20/12* (2006.01)
*B23K 20/16* (2006.01)
*B23K 101/26* (2006.01)

(52) U.S. Cl.
CPC .......... *B23K 20/125* (2013.01); *B23K 20/121* (2013.01); *B23K 20/129* (2013.01);
(Continued)

(58) Field of Classification Search
CPC ...... B23K 2101/26; B23K 20/12–1215; B23K 20/1285–1295
(Continued)

(56) References Cited

U.S. PATENT DOCUMENTS 3,699,639 A * 10/1972 Ditto .................. B23K 20/1205
228/113
3,732,613 A * 5/1973 Steigerwald ....... B23K 20/1205
228/112.1
(Continued)

FOREIGN PATENT DOCUMENTS

CA    2533616 A1 * 2/2005 ............. B23K 20/10
CA    2779728 A1 * 12/2012 ............. B23K 20/12
(Continued)

OTHER PUBLICATIONS

Machine translation of JP 2002-103060A (no date available).*
International Search Report and Written Opinion for PCT/GB2016/053759 dated Feb. 24, 2017; 10 pages.

*Primary Examiner* — Kiley S Stoner
(74) *Attorney, Agent, or Firm* — Schwabe Williamson & Wyatt, PC

(57) ABSTRACT

An apparatus for forming a friction weld, the apparatus comprising: a support arrangement; a holding member, which is supported by the supporting arrangement, and which may be driven to rotate with respect thereto, or move with respect thereto along an arcuate path; a consumable element having a first joining face, the consumable element being mounted in a mounting location on the holding member so that the first joining face is exposed, wherein the consumable element is rotatable with respect to the holding member about a first centre of rotation, and wherein when the holding member is driven to rotate or move with respect to the support arrangement, the first centre of rotation travels in an orbital motion with respect to the support arrangement;

(Continued)

and at least a first alignment arrangement, positioned to hold a first workpiece in place so that an attachment face of the first workpiece is aligned with the first joining face of the consumable element.

16 Claims, 13 Drawing Sheets

(52) U.S. Cl.
CPC .......... *B23K 20/1215* (2013.01); *B23K 20/16* (2013.01); *B23K 2101/26* (2018.08)

(58) Field of Classification Search
USPC ............ 228/112.1–114.5, 2.1–2.3; 156/73.1; 29/889–889.722
See application file for complete search history.

(56) References Cited

U.S. PATENT DOCUMENTS

| | | | | | |
|---|---|---|---|---|---|
| 4,247,346 | A | * | 1/1981 | Maehara | B23K 20/1205 156/157 |
| 4,333,670 | A | * | 6/1982 | Holko | B23K 9/232 285/148.12 |
| 4,333,671 | A | * | 6/1982 | Holko | B23K 20/129 285/148.12 |
| 4,349,144 | A | * | 9/1982 | Stevenson | B23K 20/12 228/2.1 |
| 5,165,589 | A | * | 11/1992 | Nied | B23K 11/00 228/102 |
| 5,248,077 | A | * | 9/1993 | Rhoades | B23K 20/1205 228/112.1 |
| 5,518,562 | A | * | 5/1996 | Searle | B23K 20/129 156/580 |
| 5,763,850 | A | * | 6/1998 | Hardt | B23K 11/02 219/104 |
| 6,637,642 | B1 | * | 10/2003 | Lingnau | B23K 13/00 228/112.1 |
| 6,814,823 | B1 | * | 11/2004 | White | B23K 11/0013 156/73.1 |
| 8,651,361 | B1 | * | 2/2014 | Daroff | B23K 20/12 228/112.1 |
| 2004/0256439 | A1 | * | 12/2004 | Pfeiler | B23K 20/12 228/112.1 |
| 2005/0150871 | A1 | * | 7/2005 | Offer | B23K 11/11 219/76.17 |
| 2005/0224559 | A1 | * | 10/2005 | Pfeiler | E01B 29/42 228/112.1 |
| 2006/0091186 | A1 | * | 5/2006 | Pfeiler | B23K 20/1205 228/114.5 |
| 2010/0200642 | A1 | * | 8/2010 | Burford | B23K 20/1265 228/112.1 |
| 2011/0031299 | A1 | * | 2/2011 | Bray | B23K 20/12 228/112.1 |
| 2011/0293363 | A1 | * | 12/2011 | Lutzhoft | B23K 9/20 403/270 |
| 2012/0233859 | A1 | * | 9/2012 | Cattiez | B21D 26/021 29/889.7 |
| 2014/0061185 | A1 | * | 3/2014 | Schindele | B23K 20/128 219/617 |
| 2014/0326414 | A1 | * | 11/2014 | Johnson | B23K 20/1205 156/580 |
| 2015/0298249 | A1 | * | 10/2015 | Buchler | B23K 9/08 156/64 |
| 2015/0300182 | A1 | * | 10/2015 | Mottin | B23P 6/005 416/213 R |
| 2016/0228979 | A1 | * | 8/2016 | Bray | B23K 20/028 |
| 2016/0279391 | A1 | * | 9/2016 | Gupta | A61M 25/09 |
| 2016/0297486 | A1 | * | 10/2016 | Thorson | B62D 55/26 |
| 2017/0014940 | A1 | * | 1/2017 | Thorson | B23K 20/129 |
| 2017/0016323 | A1 | * | 1/2017 | Behmlander | E21C 35/19 |
| 2017/0152930 | A1 | * | 6/2017 | Bojanowski | B23K 20/12 |

FOREIGN PATENT DOCUMENTS

| | | | | |
|---|---|---|---|---|
| DE | 1910531 A1 | * | 10/1969 | ......... B23K 20/1205 |
| EP | 504494 A2 | * | 2/1992 | |
| FR | 2390238 A1 | * | 12/1978 | ......... B23K 20/1205 |
| GB | 1324431 A | | 7/1973 | |
| GB | 1451447 A | * | 10/1976 | ............ B23K 20/12 |
| GB | 1481215 A | * | 7/1977 | ......... B23K 20/1205 |
| GB | 2322586 A | | 9/1998 | |
| JP | 53149847 A | * | 12/1978 | ............ B23K 20/12 |
| JP | 2002 103060 A | | 4/2002 | |
| JP | 2002 301578 A | | 10/2002 | |
| JP | 2010 149131 A | | 7/2010 | |
| WO | 2017/093726 A1 | | 6/2017 | |

\* cited by examiner

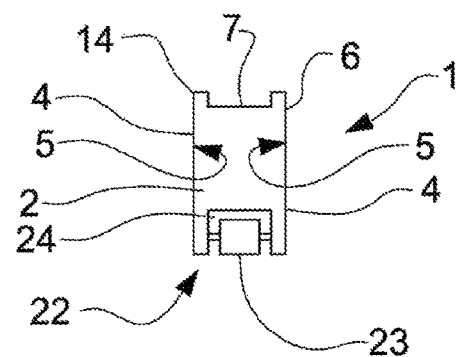
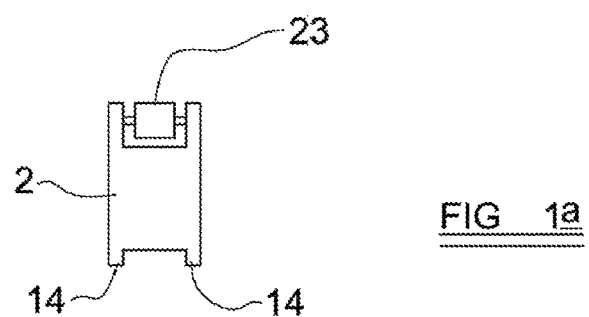
FIG 1a
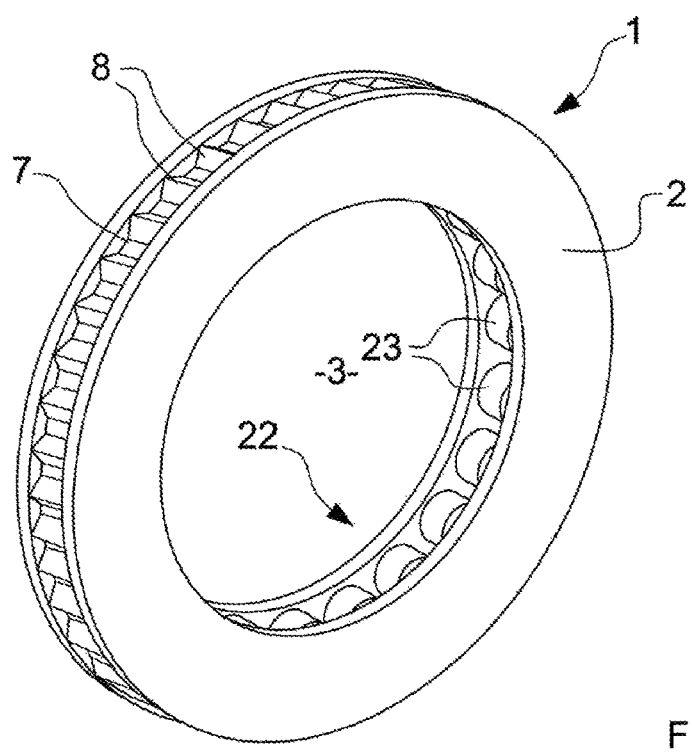
FIG 1b

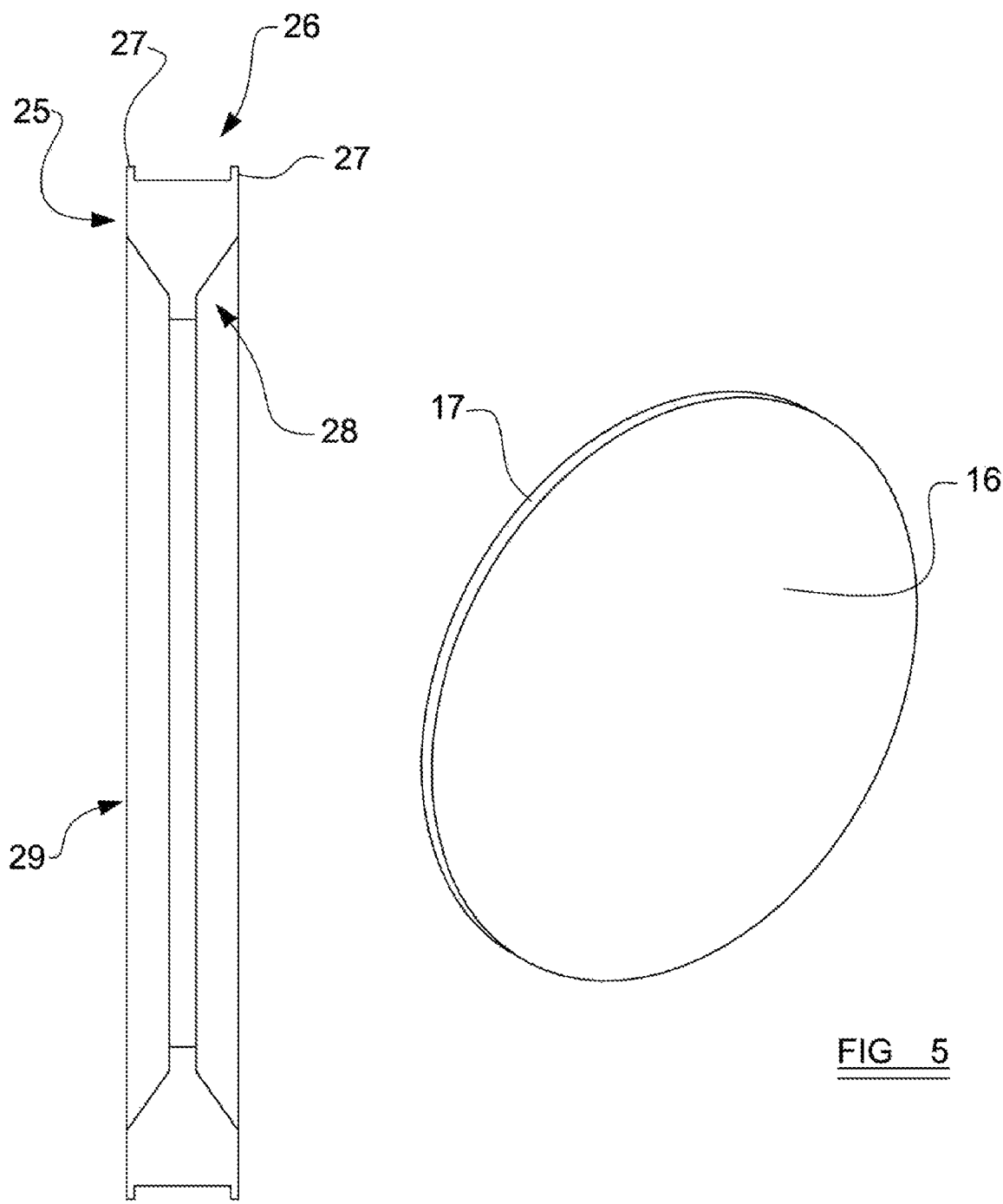

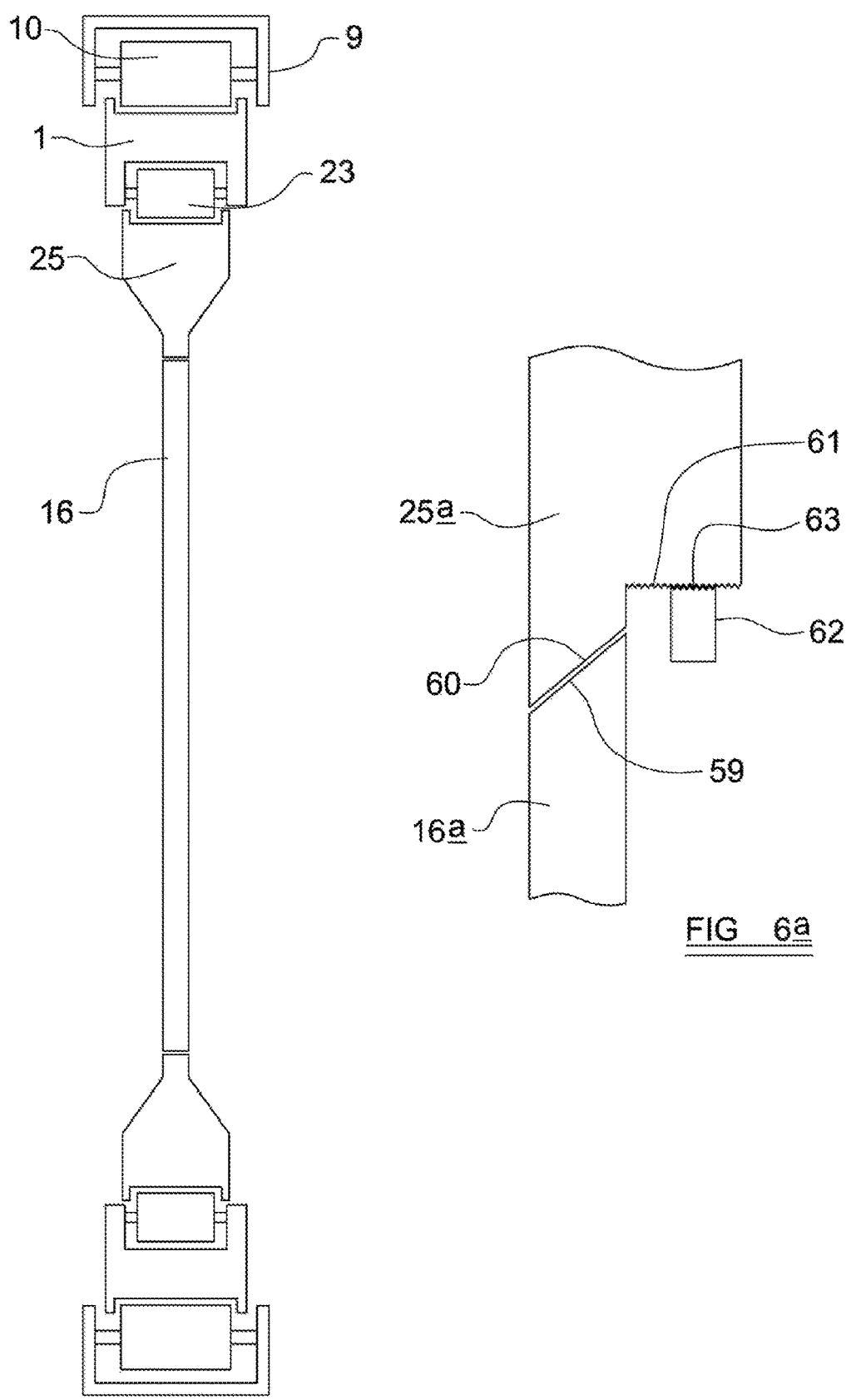

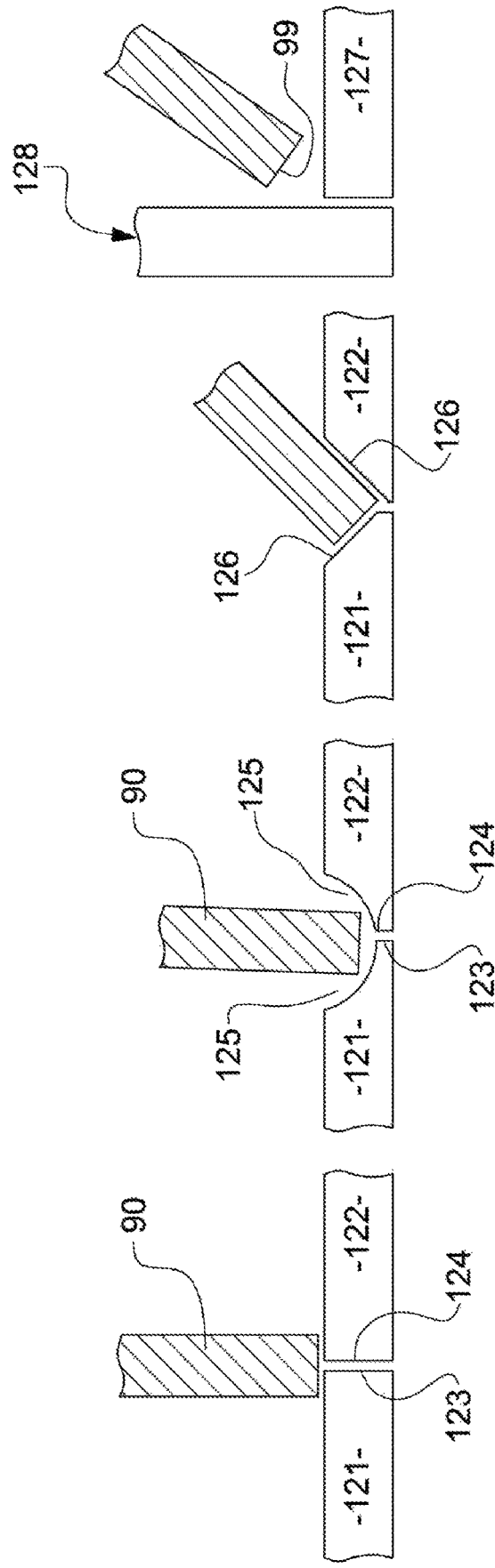

APPARATUS FOR FORMING A FRICTION WELD

CROSS-REFERENCE TO RELATED APPLICATION

The present application is a national phase entry under 35 U.S.C. § 371 of International Application No. PCT/GB2016/053759, filed Nov. 30, 2016, entitled "AN APPARATUS FOR FORMING A FRICTION WELD," which designates the United States of America, which claims priority to GB Application No. 1521079.2, filed on Nov. 30, 2015, the entire disclosures of which are hereby incorporated by reference for all purposes.

THIS APPLICATION relates to an apparatus for forming a friction weld.

Welding is a well-known technique used for joining materials, usually metals or thermoplastics, by causing fusion between the materials.

In some types of welding, heat is applied directly to the materials to be joined to cause the fusion to take place. For instance, this occurs in arc welding.

Materials may also be joined by friction welding. Friction welding is a technique in which faces of two workpieces (or other components) to be joined are pressed firmly together and are moved with respect to one another, for instance by rotation. The relative movement of the workpieces causes frictional heating, which gives rise to the fusion between the workpieces.

Friction welding has several benefits with respect to other welding techniques in which heat is directly applied, in particular the avoidance of excessive heating in the weld zone. Excessive heat generated during a welding procedure may cause significant problems, for instance unwanted change in the crystalline structure of metal workpieces.

It is an objection of the present invention to provide an improved apparatus and method for carrying out friction welding. One aspect of the present invention provides an apparatus for forming a friction weld, the apparatus comprising: a support arrangement; a holding member, which is supported by the supporting arrangement, and which may be driven to rotate with respect thereto, or move with respect thereto along an arcuate path; a consumable element having a first joining face, the consumable element being mounted in a mounting location on the holding member so that the first joining face is exposed, wherein the consumable element is rotatable with respect to the holding member about a first centre of rotation, and wherein when the holding member is driven to rotate or move with respect to the support arrangement, the first centre of rotation travels in an orbital motion with respect to the support arrangement; and at least a first alignment arrangement, positioned to hold a first workpiece in place so that an attachment face of the first workpiece is aligned with the first joining face of the consumable element.

Advantageously, the apparatus is for forming a friction weld between first and second workpieces; the consumable element has first and second joining faces; when the consumable element is mounted in the mounting location on the holding member the first and second joining faces are exposed; and the apparatus comprises first and second alignment arrangements, positioned to hold the first and second workpieces respectively in place so that attachment faces of the first and second workpieces are aligned with the respective first and second joining faces of the consumable element.

Preferably, a single alignment arrangement is provided.

Conveniently, the holding member comprises a rotor which may be driven to rotate around a second centre of rotation.

Advantageously, the mounting location comprises an aperture formed through the rotor, in which the consumable element is rotatably mounted, with the second centre of rotation being offset with respect to the first centre of the rotation.

Preferably, the consumable element is mounted within a support ring, which is rotatably mounted in the mounting location.

Conveniently, the support ring has an inner surface which is set at a first angle with respect to the axis of rotation thereof, and the consumable element has an outer rim which is offset at a second angle with respect to the axis of rotation thereof.

Advantageously, the first and second angles are the same, or substantially the same, as each other.

Preferably, the apparatus further comprises a locking element which may be removably attached to the support ring so that it abuts against a surface of the consumable element to prevent movement of the consumable element in a direction parallel with the axis of rotation thereof.

Conveniently, the rotor is arranged to be driven rotationally by a drive arrangement.

Advantageously, the drive arrangement comprises a drive gear or wheel which is engaged with the rotor, and wherein the support arrangement at least partly surrounds the rotor but has a gap or break therein to allow engagement between the drive gear or wheel and the rotor.

Preferably, the support arrangement comprises a ring gear, and the holding member comprises a planetary gear which is driven to engage the ring gear and rotate around an inner surface of the ring gear.

Conveniently, the holding member comprises a carriage which is driven to move in an arcuate path with respect to the support arrangement.

Advantageously, the carriage does not rotate with respect to the support arrangement.

Preferably, the first alignment arrangement comprises a sleeve element having an aperture formed therethrough through which the first workpiece may be inserted, and wherein the sleeve element is held in position with respect to the support arrangement.

Conveniently, the sleeve element is held spatially in position with respect to the support arrangement so that the workpiece may not move in a radial direction with respect to the consumable element.

Advantageously, the sleeve element is held in position rotationally with respect to the support arrangement.

Preferably, the apparatus further comprises a tension arrangement for driving the first workpiece towards the consumable element.

Conveniently, the apparatus further comprises a rotation inhibiting arrangement which is operable to prevent or inhibit rotation of the consumable element with respect to the first workpiece.

Advantageously, the rotation inhibiting arrangement comprises a retaining element which is attached to a part of the consumable element.

Preferably, the retaining element is supported by a support mechanism that allows the retaining element to move in an orbital motion as the consumable element moves in the orbital motion with respect to the support arrangement.

Conveniently, the retaining element is mounted on a flexible connection that allows it to remain attached to the consumable element as the consumable element moves in the orbital motion with respect to the support arrangement.

Advantageously, the rotation inhibiting arrangement comprises one or more projections that protrude from a face of the consumable element, and which may slide with respect to a retaining arrangement that substantially does not rotate with respect to the first workpiece.

Preferably, the or each projection has one or more faces that are generally parallel with a line passing from the projection to the centre of rotation of the consumable element, and the retaining arrangement comprises a surface that is substantially aligned with, and lies against or adjacent to, the or each face.

Conveniently, the or each projection has a pair of opposed and substantially parallel faces, and the retaining arrangement comprises a pair of opposed surfaces that are substantially aligned with, and lie against or adjacent to, the faces.

Advantageously, for the or each projection, the retaining arrangement is movable with respect to the first workpiece in a direction which is substantially perpendicular to the direction in which the projection may slide with respect to the retaining arrangement.

Preferably, the alignment arrangement is adapted to attach the apparatus to a face of a workpiece having an area that is at least as great as the cross-sectional area of the support arrangement.

Conveniently, the apparatus is a friction surfacing apparatus and: the consumable element is elongate; the first workpiece comprises a surface onto which material from the consumable element is to be deposited; a drive arrangement is provided to apply a force to the consumable element to drive the consumable element towards the surface; and a translation arrangement is provided to cause relative translational movement between the consumable element and the surface.

Advantageously, at least a part of the consumable element is mounted in a spherical bearing, which is mounted within the holding member.

Preferably, the apparatus is an apparatus for forming a welded joint between first and second adjacent workpieces, and: the consumable element is elongate; the alignment arrangement holds the two workpieces adjacent one another, so that the consumable element is aligned with a region where the workpieces meet one another; a drive arrangement is provided to apply a force to the consumable element to drive the consumable element towards the region where the workpieces meet one another; and a translation arrangement is provided to cause relative translational movement between the consumable element and the region where the workpieces meet one another.

Conveniently, the attachment faces of the two workpieces comprise areas of the workpieces adjacent the region where the workpieces meet one another.

Another aspect of the present invention provides a method for forming a welded joint, the method comprising a support arrangement; providing a consumable element having a first joining face; mounting the consumable element in a mounting location of a holding member so that the first joining face is exposed, wherein the consumable element is rotatable with respect to the holding member about a first centre of rotation; providing a first workpiece having an attachment face; aligning the attachment face of the first workpiece with the first joining face of the consumable element; and rotating the holding member, or moving the holding member along an arcuate path, so that the first centre of rotation travels in an orbital motion, thus generating frictional forces between the attachment face of the first workpiece and the first joining face of the consumable element.

Advantageously, the method is for joining two workpieces; the consumable element has first and second joining faces; when the consumable element is mounted in the mounting location of the holding member, the first and second joining faces are exposed; first and second workpieces, each having an attachment face, are provided; the aligning step comprises aligning the attachment faces of the first and second workpieces with the respective first and second joining faces of the consumable element; and the rotating step generates frictional forces between the attachment faces of the first and second workpieces and the first and second joining faces of the consumable element.

Preferably, the method is for joining the consumable element to a single workpiece.

Conveniently, the consumable element has a first joining face and a second bracing face; when the consumable element is mounted in the mounting location of the holding member, the first and second faces are exposed; a bracing element, having a bracing face, is provided; the aligning step comprises aligning the attachment face of the first workpiece and the bracing face of the bracing element with the respective first and second faces of the consumable element; and during the rotating step, the bracing element is pressed against the bracing face, but no welded joint is formed between the bracing element and the bracing face.

A further aspect of the present invention provides a method of friction surfacing, comprising the steps of: providing an elongate consumable element having a first joining face; mounting the consumable element in a mounting location of a holding member so that the first joining face is exposed, wherein the consumable element is rotatable with respect to the holding member about a first centre of rotation; providing a surface; aligning the surface with the first joining face of the consumable element; and rotating the holding member, or moving the holding member along an arcuate path, so that the first centre of rotation travels in an orbital motion, thus generating frictional forces between the surface and the first joining face of the consumable element.

Advantageously, the method further comprises the step of driving the consumable element towards the surface as the welding operation proceeds.

Preferably, the method further comprises the step of applying relative translational motion between the consumable element and the surface as the welding operation proceeds.

Another aspect of the present invention provides a method of forming a welded joint between two adjacent workpieces, comprising the steps of: providing an elongate consumable element having a free end; mounting the consumable element in a mounting location of a holding member so that the free is exposed, wherein the consumable element is rotatable with respect to the holding member about a first centre of rotation; holding the two workpieces adjacent one another, so that the consumable element is aligned with a region where the workpieces meet one another; rotating the holding member, or moving the holding member along an arcuate path, so that the first centre of rotation travels in an orbital motion, thus generating frictional forces between the free end of the consumable element and the region where the workpieces meet one another.

Conveniently, the method further comprises the step of driving the consumable element towards the region where the workpieces meet one another as the welding operation proceeds.

Advantageously, the method further comprises the step of applying relative translational motion between the consumable element and the region where the workpieces meet one another as the welding operation proceeds.

In order that the invention may be more readily understood, embodiments of the invention will now be described, by way of example, with reference to the accompanying drawings, in which:

FIGS. 1a and 1b show a rotor suitable for use with the present invention;

FIG. 4 shows a support ring suitable for use with the present invention;

FIG. 5 shows a consumable element suitable for use with the present invention;

FIG. 6 shows a support casing, rotor, support ring and consumable element assembled together;

FIG. 6a shows parts of an alternative support ring and consumable element;

FIGS. 17a-17d show apparatuses for forming a welded joint between two members.

Figure 2:
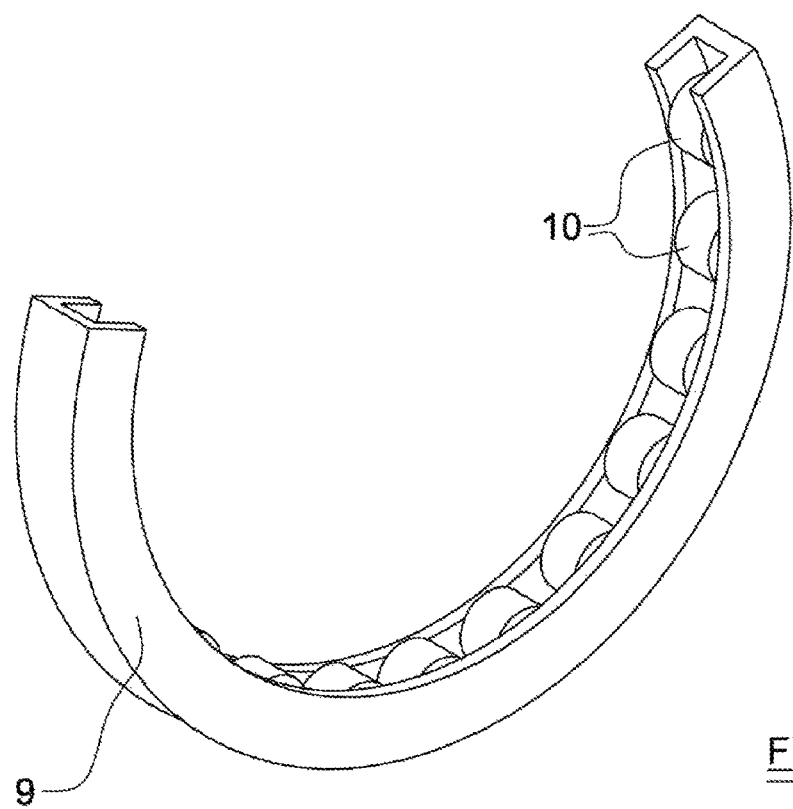
FIGS. 2 and 3 show a support casing 9 suitable for use with the present invention.

Turning firstly to FIGS. 1a and 1b, a rotor 1 is shown. The rotor 1 generally takes the form of an annular ring, having a rim 2 surrounding an aperture 3 that passes all of the way through the rotor 1.

The rim 2 has generally parallel, opposing main surfaces 4, and preferably has a substantially constant thickness 5 over most of this area.

The outer edge 6 of each face 4 of the rim 2 is preferably circular or substantially circular, and an outer wall 7 of the rim 2 may have a series of spaced apart teeth 8 formed therein. In preferred embodiments the outer wall 7 of the rim has two protrusions 14 which extend upwardly, on either side of the other wall 7, so the outer wall 7 generally defines a trough. In these embodiments any teeth 8 are formed between the protrusions.

The aperture 3 that passes through the rotor 1 is preferably circular or substantially circular. However, the geometric centre of the circular shape of the aperture 3 is off-set from the geometric centre of the circular shape of the rim 2 of the rotor 1. It will therefore be understood that the aperture 3 is off-centre with respect to the rim 2, and is not concentric therewith. In one embodiment, the diameter of the aperture 3 is 300 mm, with the distance between the geometric centre of the rim 2 and the geometric centre of the aperture 3 being 5 mm. The degree of off-set of the aperture 3 with respect to the rim 2 may therefore be relatively small as a proportion of the overall diameter of the aperture 3. In preferred embodiments, the off-set distance (i.e. the distance between the geometric centres of the rim 2 and the aperture 3) is between 0.5% and 3% of the diameter of the aperture (although it should be understood that the off-set distance may be outside this range, depending on the process parameters and the particular materials being welded). More preferably, the off-set distances between 1% and 2% of the diameter of the aperture 3. More preferably, the off-set distance is between 1% and 2% of the diameter of the aperture 3. In even more preferred embodiments the off-set distance may be around 1.67% of the diameter of the aperture 3.

However, in other examples the off-set distance may be greater. For instance, examples are envisaged in which the off-set distance is as high as 30% of the diameter of the aperture. The overall range may therefore be from 0.5% to 30%.

The rotor 1 is mounted in a support casing 9, which is shown in FIG. 2. The support casing 9 is arcuate, and preferably takes the form of a portion of a circular or substantially circular ring. The inner side of the ring is open, and presents a generally inward-facing trough. A series of spaced-apart first rollers 10 are provided within the trough. In preferred embodiments the support casing 9 describes more than half of a full circle, and may comprise, for example, 200-250° of a full circle.

The first rollers 10 are free to rotate, and are set in a plane which is generally aligned with the plane of the support casing 9 itself.

The support casing 9 will be held in place by a suitable stand or support (not shown), which may rest on the ground or be supported by one or more other components, as necessary. The stand may be formed separately from the support casing 9, or may be formed integrally therewith. In some embodiments, one or more interchangeable stands or other supports may be provided, so that the support casing 9 may be held in place in different situations.

Figures 3, 3A:
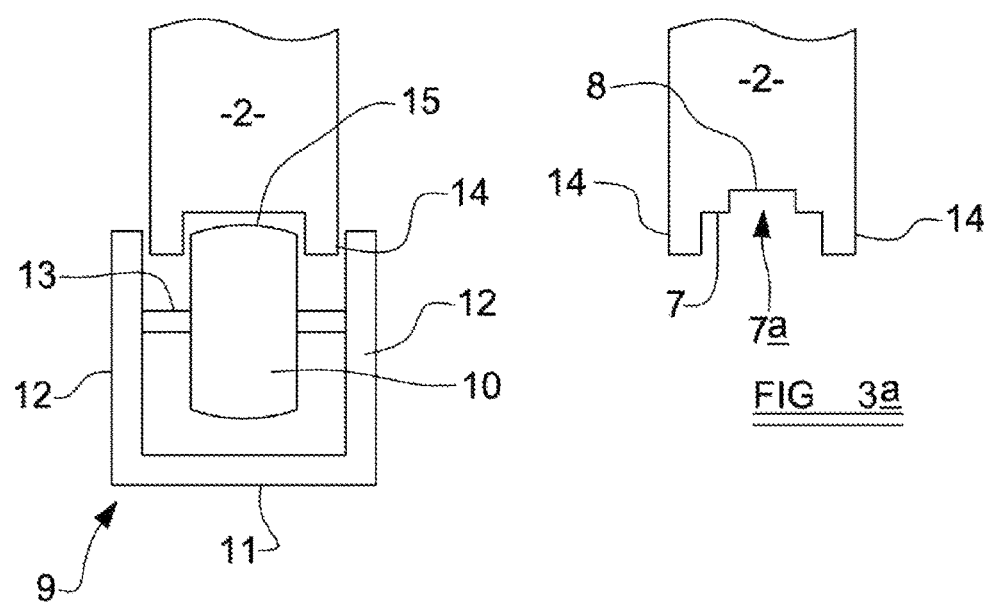
FIG. 3a shows a part of an alternative rotor suitable for use with the present invention.

The rotor 1 is installed in the support casing 9, although the support casing 9 is shown without the rotor 1 in FIG. 2 for the purposes of clarity. FIG. 3 shows a cut-away view of a part of the support casing 9. It can be seen that the support casing 9 has an outer wall 11 and two opposing sidewalls 12, which define the trough shape. One first roller 10 is shown, which is mounted for rotation with respect to the support casing 9 on an axle 13.

The rim 2 of the rotor 1 is also shown. The dimensions of the support casing 9 and rotor 1 are such that the outer surface 7 of the rim 2 of the rotor 1 rests on the roller 10, and the two protrusions 14 that are formed on the outer surface 7 extend past the supporting edge 15 of the first roller 10 on both sides.

It will therefore be understood that, with the rotor 1 mounted within the support casing 9, the rotor 1 may rotate freely (or be driven to rotate) with respect to the support casing 9, but cannot be removed therefrom. The rotor 1 cannot be removed radially from the support casing 9, because the support casing 9 describes more than half of a full circle and therefore the gap formed in the support casing 9 has a width which is less than the outer diameter of the rotor 1. The rotor 1 may also not be removed axially from the support casing 9, because the protrusions 14 formed on the outer surface 7 of rim 2 of the rotor 1 lie on either side of the first rollers 10 of the support casing 9, and the first rollers 10 will therefore prevent longitudinal motion of the rotor 1 with respect to the support casing 9 in either direction.

While the use of first rollers 10 is described above, any other suitable arrangement that allows free rotation of the rotor 1 may also be used. For instance, a plain bearing, comprising a series of appropriate bushings, may be used.

In use, a drive gear (not shown) will be positioned so that the teeth of the drive gear mesh with the teeth 8 provided on the outer surface 7 of the rotor 1. The drive gear engages with the rotor 1 at a point on its outer surface where it protrudes from the support casing 9, i.e. at a part of the rotor 1 that is aligned with the gap in the support casing 9. It will therefore be understood that the rotor 1 is supported and held in place by the support casing 9, and may be driven to rotate by the drive gear.

The drive gear will preferably be driven by a motor (not shown), which may take any suitable form.

In other embodiments, however, the rotor may be driven by one or more gears, belts, chains, work screws, harmonic drives, or any other suitable drive methods. Some techniques for driving the rotor 1 may not require a section of the rotor 1 to be exposed by way of a gap in the support casing 9, and in this embodiment the support casing 9 may comprise a complete ring, extending all the way around the rotor 1 and not having a break formed therein. For instance, drive gears, pulleys etc. may be provided at one or more ends (axially) of the rotor, instead of engaging with the middle of the rotor. In these embodiments the drive gears/pulleys etc. are likely to be positioned beside (or indeed spaced apart axially from) the support casing.

As described above, the outer surface 7 of the rotor 2 may have teeth 8 formed thereon. If this is the case, it may be undesirable for the first rollers 10 to contact the teeth 8 directly, as this is likely to damage the first rollers 10. To avoid this, the outer surface 7 of the rotor 2 may have a groove or trough 7a formed therein, running around the outer surface 7 of the rotor 2, as shown in FIG. 3a. The teeth 8 can be located in the groove or trough 7a, with the remainder of the outer surface 7 being smooth or substantially smooth. This means that the first rollers 10 can rest on the outer surface 7 without contacting the teeth 8, and that a drive gear or the like (not shown) can be inserted into the groove or trough 7a to engage the teeth 8.

At its inner surface 22 (i.e. the surface which surrounds the aperture 3), the rotor 1 supports a series of second rollers 23, which are each arranged to rotate around an axle which is generally parallel with an axis passing directly through the centre of the aperture 3. It will therefore be understood that, in this embodiment, the second rollers 23 are parallel or substantially parallel with the first rollers 10. The second rollers 23 are arranged to rotate freely. In the embodiment shown, the second rollers 23 are provided wholly or partly within an inward-facing trough 24 or other recess, which is formed on the inner side 22 of the rotor 1.

In preferred embodiments a series of spaced apart second rollers 23 are provided around the inner side 22 of the rotor 1. However, any similar arrangement which provides the same overall function may equally be used.

Turning to FIG. 4, a cut-away view is shown of a support ring 25.

The outer edge 26 of the support ring 25 is similar to the outer edge 7 of the rim 2 of the rotor 1, in that it has a pair of protrusions 27 formed at each side of the outer edge 26, so that, in cross-sectional view, the outer edge 26 takes the form of a trough.

An inward-facing inner edge 28 of the support ring 25 surrounds an inner aperture 29, and has a width which is reduced with respect to the width of the rest of the support ring 25. In the preferred embodiments this reduced width is around half the width of the remainder of the support ring 25.

FIG. 5 shows a disc 16 of a material which will be used in the process of forming a welded joint, as discussed in more detail below. In the example shown the disc 16 is circular or substantially circular in shape and has an outer diameter which is the same or substantially the same as the inner diameter of the support ring 25. The width of the rim 17 of the disc 16 is preferably the same or substantially the same as the width of the narrowed inner edge 28 of the support ring 25.

In use, the disc 16 may be placed in the inner aperture 29 of the support ring 25, so that it is supported by the support ring 25. In preferred embodiments the disc 16 fits tightly in the inner aperture 29 and may not readily rotate with respect to the support ring 25.

The disc 16 may be referred to a "puck".

FIG. 6 shows the components described above in an assembled fashion (although it should be appreciated that certain components, such as collars, which may be present in a fully assembled device embodying the invention, have been omitted for the purposes of clarity). As already described, the rotor 1 fits within the support casing 9, and rotates freely on the first rollers 10 which are held by the support casing 9.

The support ring 25 fits within the inner aperture 3 of the rotor 1, and the second bearings 23 held by the rotor 1 fit within the trough shaped formed on the outer edge 26 of the support ring 25. The support ring 25 rotates freely on the second rollers 23.

Finally, the puck 16 fits within the inner aperture 29 of the support ring 25.

One application of the apparatus described above may be in the welding together of two free ends of members, particularly (but not exclusively) elongate members such as sections of railway track rails. To carry out this welding operation, the free ends of two rail sections are pressed against the opposing major surfaces of the puck 16, and the rotor 1 is then driven to rotate, by (as discussed above) the drive gear and motor. As the rotor 1 rotates, it will be understood that the puck 16 performs an eccentric motion, because of the off-set between the geometric centre of the puck 16 and the geometric centre of the inner aperture 3 of the rim 2 of the rotor 1. In turn, this will cause the major surfaces of the puck 16 to slide against the free ends of the rail sections, and as a result of the frictional forces that must be overcome in order to do this, large quantities of heat energy will be generated at the interfaces between the major surfaces of the puck 16 and the free ends of the rail sections. As a result of this frictional heat, a welded joint may be formed between the two rail sections, with the puck 16 being effectively welded in place between the two free ends of the rail sections, and forming part of the final welded joint. It will be understood that the puck 16 therefore acts as a consumable puck in a welding process of this type.

The major surfaces of the puck 16 may be substantially planar, and are preferably parallel with each other. However, in other embodiments the major surfaces are profiled and/or textured in the axial direction in order to improve the welding process. In these embodiments, when the free end of object to be welded is pressed against a major surface of the puck 16, only some parts of the free end may come into contact with the puck 16 in the first instance, with other parts of the free end coming into contact with the puck 16 during later stages of the welding process.

In preferred embodiments, the puck 16 is formed from the same or substantially the same material as the two rail sections that are to be welded together. However, in other embodiments the puck 16 may be formed from a different material to that of the rail sections, and the skilled reader will understand the criteria that may be used to select a suitable material. For instance, a different material may be used in order to improve the mechanical performance of the resulting welded joint, and/or if a joint is to be formed between two workpieces that have different profiles or metallurgical characteristics.

As will be understood by the skilled reader, the free end of each rail section must be placed against the puck 16 so that, during the full range of rotation of the rotor 1, all parts of the free end fall within the perimeter of the appropriate major surface of the puck 16 (as viewed in an axial direction). The puck 16 must therefore have a sufficiently large diameter that no part of the free end of the rail section protrudes radially outward past the outer circumference of the puck 16 as the rotor 1 rotates.

In preferred embodiments, the rotor 1 may be formed in two parts which are removably attachable to each other. This allows two elongate elements welded together by the process described above to be removed from the rotor 1 once the welding process is complete. For instance, the rotor 1 may be formed in two halves (not shown) which may be firmly attached to one another by way of bolts, clamps and/or further suitable fixings. During the welding procedure the two halves remain attached to one another. Following the completion of the welding operation the two halves may be uncoupled from each other and moved away.

Similarly, the support casing 9 may also be formed into two or more parts which may be removably attached to each other. It will be appreciated, that, unless the support casing 9 is formed in this way, it may be difficult or impossible to remove the rotor 1 from the support casing 9 once the welding operation has been completed.

Once again, the support ring 25 may also be formed in two or more removably attachable parts, so that it can be removed once the welding operation is complete.

The skilled reader will understand that, following completion of a welding operation, it will be necessary to remove the support casing 9 first, and then to remove the rotor 1 in a subsequent step, before finally removing the support ring 25.

FIG. 6a shows an alternative method of holding the puck with respect to the support ring. In this embodiment, the puck 16a has an outer rim 59 which is set at an angle to the axis of rotation of the puck 16a. The puck 16a therefore takes a frustoconical form. The angle of the outer rim 59 with respect to the axis of rotation may, in some examples, be between 5 and 20°, although other angles are also possible.

The support ring 25a has an inward-facing engagement surface 60, which is set at an angle with respect to the axis of rotation of the support ring 25a. In preferred embodiments, this angle is the same, or substantially the same, as the angle of offset of the outer rim 59 of the puck 16a.

Beside this engagement surface 60, on the side where the inner diameter of the engagement surface 60 is greatest, is an inward-facing surface 61. The inward-facing surface 61 is, in the example shown, threaded. A locking ring 62 is provided, having an outer surface 63 which is threaded in such a manner that it can engage the threaded inward-facing surface 61.

In use, the puck 16a is firstly inserted into the support ring 25a, so that the offset outer rim 59 is received by, and substantially matches, the inward-facing engagement surface 60. The locking ring 62 is then threaded onto the threaded inward-facing surface 61, and advanced until it presses against the side surface of the puck 16a. The reader will understand that the locking ring 62 must be of sufficient radial depth that it will, when seen along the axis of rotation, overlap with the side surface of the puck 16a.

Once this has been done, the puck 16a cannot move along the axis of rotation in either direction, being prevented from doing so in one direction (left, in FIG. 6a) by the contact of the angled outer rim 59 with the angled engagement surface 60, and in the other (right, in FIG. 6a) by the locking ring 62.

In other embodiments, however, the puck may be allowed some freedom to move through a limited distance in a direction parallel with the axis of rotation thereof.

Figure 7:
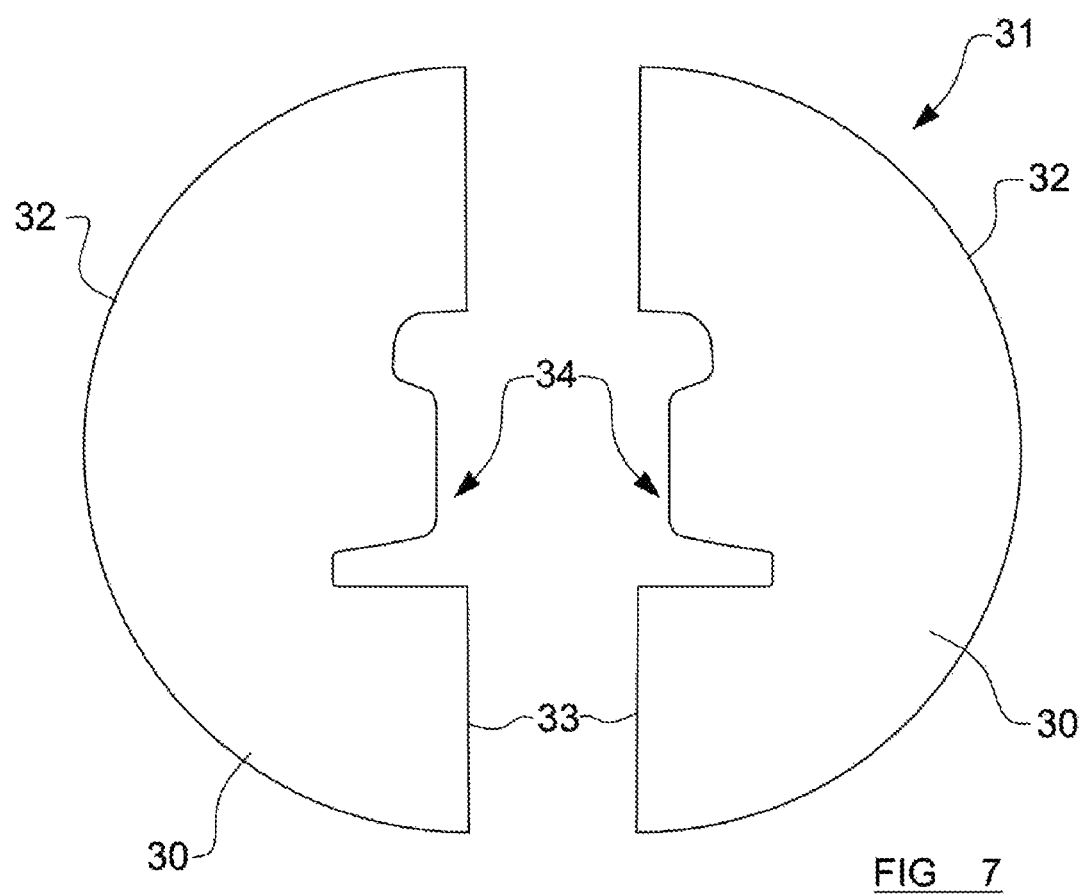
FIG. 7 shows a holding sleeve suitable for use with the present invention.

Turning to FIG. 7, two halves 30 of a holding sleeve 31 are shown. Each half 30 generally takes the form of a half-disc, having a first perimeter section 32 which is generally semi-circular, and a second perimeter section 33 which is generally straight and extends directly between the free ends of the semi-circle. A cut-out section 34 is formed on the second straight perimeter section 33. In preferred embodiments cut-out sections 34 are formed on the second perimeter section 33 of both halves 30, although in some embodiments it is envisaged that a cut-out section may be formed in only one of the halves.

When the two halves 30 are placed together so that their respective second perimeter portions 33 contact each other, the two halves 30 preferably form a generally complete circular shape, having an aperture in the middle which is the combination of the two cut-out portions 34. A circular shape is preferred since this is relatively easy to machine, although it should be understood that any other suitable external shape for the holding sleeve may be used.

In other examples, the two halves may not form a complete circle or other enclosed shape, and there may be one or more gaps in the perimeter of the shape. For instance, the two halves may form a horseshoe shape when combined, i.e. a shape with one gap in the perimeter, with the gap being in contact with the cut-out section formed through the support sleeve 31.

In this embodiment, the holding sleeve 31 is intended to hold a section of rail. Therefore, each of the cut-out sections 34 is generally in the form of half of the cross-sectional profile of a rail that is to be held. When the halves 30 are placed together, the overall shape of the aperture in the centre of the holding sleeve 31 will be that of the entire cross-sectional shape of the rail.

Of course, not all rails have the same cross-sectional profile, and the shapes of the cut-out portions 34 will need to be formed to match the particular type of rails that are to be held by the holding sleeve 31.

Preferably, each of the halves 30 has a substantially constant thickness.

For each of the elongate elements that are to be welded together by the welding apparatus, one holding sleeve 31 is preferably provided. The holding sleeve 31 is provided to one side of the rotor 1 described above, and one of its functions is to hold the elongate element in position, and prevent it from moving or rotating.

As can be seen from FIG. 7, the cross-sectional shape of the rail that is to be welded in this example is irregular, and if a rail is to be welded is fitted closely within the aperture formed through the holding sleeve 31, rotation of the rail section will be prevented, unless the holding sleeve 31 is itself not held in place sufficiently strongly, or is deformed under the forces arising from the welding operation.

In other embodiments, however, one or both of the elongate elements to be welded together may have a generally circular cross-sectional shape. The skilled reader will understand that holding such an element rotationally still during the welding operation will be more challenging, and it may be necessary to drive one or more fasteners such as bolts into the perimeter of the elongate element to provide additional resistance against rotation as the welding operation progresses.

In use, one support sleeve 31 is mounted on either side of the rotor 1, to hold in place the elongate elements that are to be welded together. The support sleeves 31 can be held in place in any suitable manner, although it is important that the alignment of the support sleeves 31 with respect to the rotor 1 is maintained accurately and consistently as the welding operation proceeds.

In preferred embodiments of the invention the support sleeves 31 are attached to the support casing 9, or are held in place by components which are themselves attached to the support casing 9. This will help to ensure the correct alignment during the welding operation. Alternatively, the rotor 1 may have an axial extension (not shown) on one or both sides, with the/each extension having inward-facing rollers on which a support sleeve 31 may be rotatably mounted. In these embodiments, the workpiece that passes through the support sleeve 31 will preferably be rotationally fixed (for example through a connection to the support casing, which may also maintain lateral alignment), and this will prevent the support sleeve 31 from rotating with the rotor 1, i.e. the rotor 1 will rotate around the support sleeve 31 while the support sleeve 31 remains rotationally still. However, the support sleeve 31 will hold the workpiece laterally in position with respect to the rotor 1. An advantage of an embodiment of this kind is that any lateral movement or vibration of the rotor 1 will be transmitted directly to the support sleeve 31, and hence to the workpiece, and so the relative lateral positioning of the rotor 1 and workpiece will be accurately maintained.

It is important that each workpiece may move longitudinally with respect to the puck 16. This allows the workpieces to be driven against the major surfaces of the puck 16 during the welding operation. One way in which this can be achieved is for each support sleeve 31 to allow the workpiece that passes through it to slide longitudinally with respect to the support sleeve 31. In such embodiments, the support sleeve 31 may be mechanically restrained from rotation, for instance through a connection with the support casing. The connection may take the form of one or more connection arms (not shown), which extend outwardly from the support sleeve 31 and are joined to, or formed integrally with, the support casing or another fixed, non-rotating object which is attached to the support casing or external of the support casing. In preferred embodiments, two connection arms extend outwardly from the support sleeve 31 in substantially opposite directions and are attached to the support casing. The connection arms may be slidably mounted with respect to the support casing, in the axial direction, to allow the support sleeve 31 (and hence the workpiece) to slide axially with respect to the puck 16.

The aperture through the support sleeve 31 will need to have a shape which matches at least part of the shape of the workpiece closely, but is not too much of a close fit around the workpiece that the workpiece is prevented from sliding longitudinally through the aperture.

The preferred way in which this longitudinal moment can be achieved is for the workpiece to be longitudinally fixed with respect to the support sleeve 31, but for the support sleeve 31 itself to be longitudinally movable with respect to the rotor 1.

The workpiece may be longitudinally fixed with respect to the support sleeve 31 by, for example, the use of wedges which are inserted or driven into grooves (not shown) which are formed in the outer face of the support sleeve 31. The tolerances in forming the aperture in each support sleeves 31 may be around 0.2 mm, although this will depend on the process used to form the aperture. Tapering grooves may be formed immediately around the aperture in the centre of the support sleeve 31. The taper of these grooves is such that the grooves are wider on the outer face of the support sleeve 31, and taper towards the inner face thereof. The workpiece is inserted through the aperture, and may be pressed forcefully against a major surface of the puck 16. Wedges are then driven into the grooves, thus retaining the workpiece in place longitudinally with respect to the support sleeve 31. The wedges may, for example, be driven into place by small hydraulic cylinders, and there may be one such cylinder for each wedge. It will be understood that, in these embodiments, the shape of the aperture formed through the support sleeve 31 may not match the cross-sectional shape of the workpiece, since the aperture must accommodate not only the workpiece but the wedges as well.

The longitudinal movement of the support sleeve 31 with respect to the rotor 1 may be achieved by allowing the support sleeve 31 to slide longitudinally with respect to the support casing 9. The support sleeve 31 and support casing 9 may be formed with cooperating tongue and groove elements, or any other suitable arrangement that allows the support sleeve 31 to move longitudinally with respect to the support casing 9, but does not allow any relative rotational movement between these components. The support casing 9 may have an end stop (for instance, in the form of an inward-facing lip or other protrusion) to prevent the support sleeve 31 from coming too close to, or touching, the rotor 1 or puck 16.

The skilled reader will appreciate that relative longitudinal motion between the puck 16 and the workpiece may achieved by any other suitable means.

Figure 8:
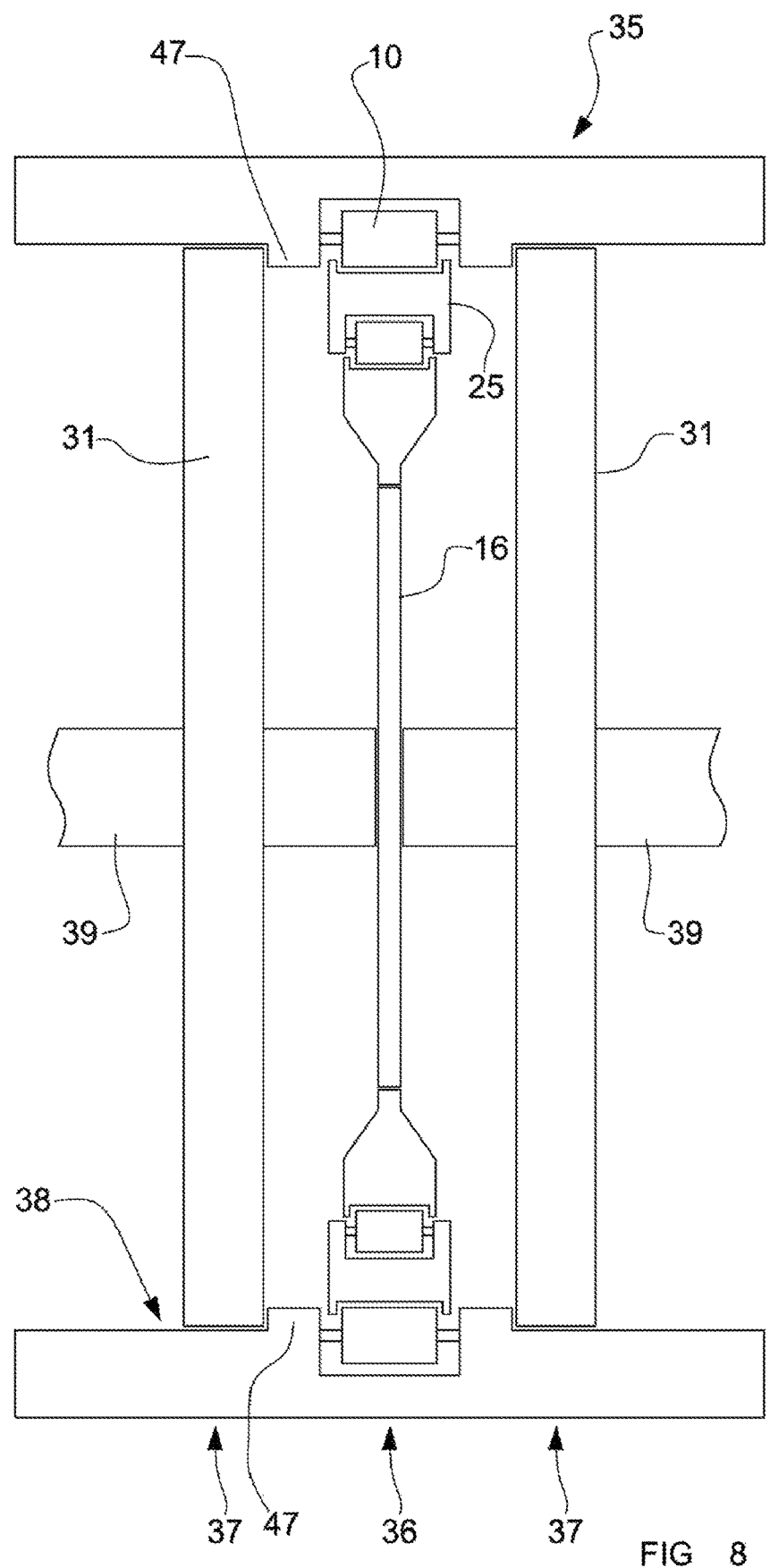
FIG. 8 shows a welding apparatus embodying the present invention.

Turning to FIG. 8, an alternative, second support casing 35 is shown. FIG. 8 shows a cross-sectional view, taken through a horizontal plane passing through the centre of the second casing 35. It is envisaged that, like the support casing 9 shown in FIG. 2, the second support casing 35 will form only part of a full circle, and will have an open section to allow rotational driving of the rotor.

The second support casing 35 has a central section 36 and left and right side sections 37. The central section 36 is effectively the same as the support casing 9 shown in FIGS. 2 and 3, in that it has an inward-facing first trough supporting first rollers 10. The rotor 1 is supported by, and rotates on, the first rollers 10, and the support ring 25 rotates on second rollers 23 supported by the rotor 1. The puck 16 is held in place by the support ring 25.

The side sections 37 are, in the embodiment shown, formed in a unitary fashion with the central section 36.

In each side section 37, an inward-facing ring 38 is formed on the inward-facing rim of the second support casing 35. The ring 38 is sized to accommodate a support sleeve 31, as shown in FIG. 7, so that it may slide longitudinally with respect to the second support casing 38, in the same manner as described above. An inwardly protruding lip 47 is provided at or near an inner edge of each inward-facing ring 38, to act as an end-stop and prevent the support sleeves 31 from moving too close to the rotor 1. The second support casing 35 holds each support sleeve 31 so that it is parallel or substantially parallel with the puck 16, when it is held in position by the components described above.

In preferred embodiments an arrangement is provided to prevent each support sleeve 31 from rotating with respect to the second support casing 35. In one embodiment, one or more cooperating tongue and groove arrangements are provided. Outwardly-protruding tongues (not shown) may be provided on the outer perimeter of each support casing 31, with these tongues fitting into appropriately-shaped grooves (not shown) provided on the inner rim of the side sections 37 of the second support casing 35. Alternatively, the grooves may be provided on the support sleeves 31, with inwardly-protruding tongues being provided on the inner rim of the second support case 35. As a further possibility, a combination of these two may be provided. Any other suitable arrangement to prevent rotation of the support sleeves 31 with respect to the second support 35 may also be used. An advantage of a tongue-and-groove type arrangement is that it will allow the support sleeves 31 to slide longitudinally with respect to the second support casing 35.

The support sleeves 31 are oriented with respect to the second support casing 35 so that two rail sections 39 that are to be welded together are held in the correct rotational orientation. If the support sleeves 31 are as shown in FIG. 7, it is envisaged that the support sleeves 31 will be oriented so that the apertures formed through the centres thereof (comprising the combination of the shapes of the cut-out sections 34) are aligned with each other, so that when the rail sections 39 are welded together they form a continuous rail having a consistent cross-section along its length.

It should be noted that in other applications, two workpieces may be joined so that their cross-sections are not aligned, or are not the same shape.

The two rail sections 39 are then passed through the apertures formed through the centres of the support sleeves 31, as shown in FIG. 8, so that they can be pressed against the major opposing surfaces of the puck 16 in preparation for the welding operation.

In the arrangement shown in FIG. 8, the support sleeves 31 maintain the spatial and rotational alignment of the rail sections 39. The rail sections 39 must also be pressed firmly towards each other, i.e. against the opposing major surfaces of the puck 16. In the arrangements shown in FIG. 8, these forces are provided by further clamps, which are not shown in FIG. 8. In other examples, the axial force may be transmitted to the rail sections 39 through the support sleeves 31.

In further embodiments, the support sleeves 31 themselves may be provided on rollers which are supported on axial extensions of the rotor 1, as described above in relation to the embodiment shown in FIG. 6. The support sleeves 31 will therefore be able to rotate freely with respect to the rotor 1. In these embodiments, the support sleeves may be used for spatial alignment of the elongate elements that are to be joined in the welding operation, and the rotational alignment of the elongate elements will be maintained by axial extensions of the support sleeves 31 which extend beyond the rotor 1 and connect to slide guides or the like, which are fixed to or form part of the casing, or to other elements such as clamps.

As described above, in this embodiment wedges may be inserted or driven into grooves (not shown) which are formed in the outer face of each support sleeve 31, to hold the elongate elements firmly in place with respect to the support sleeves.

Figure 9:
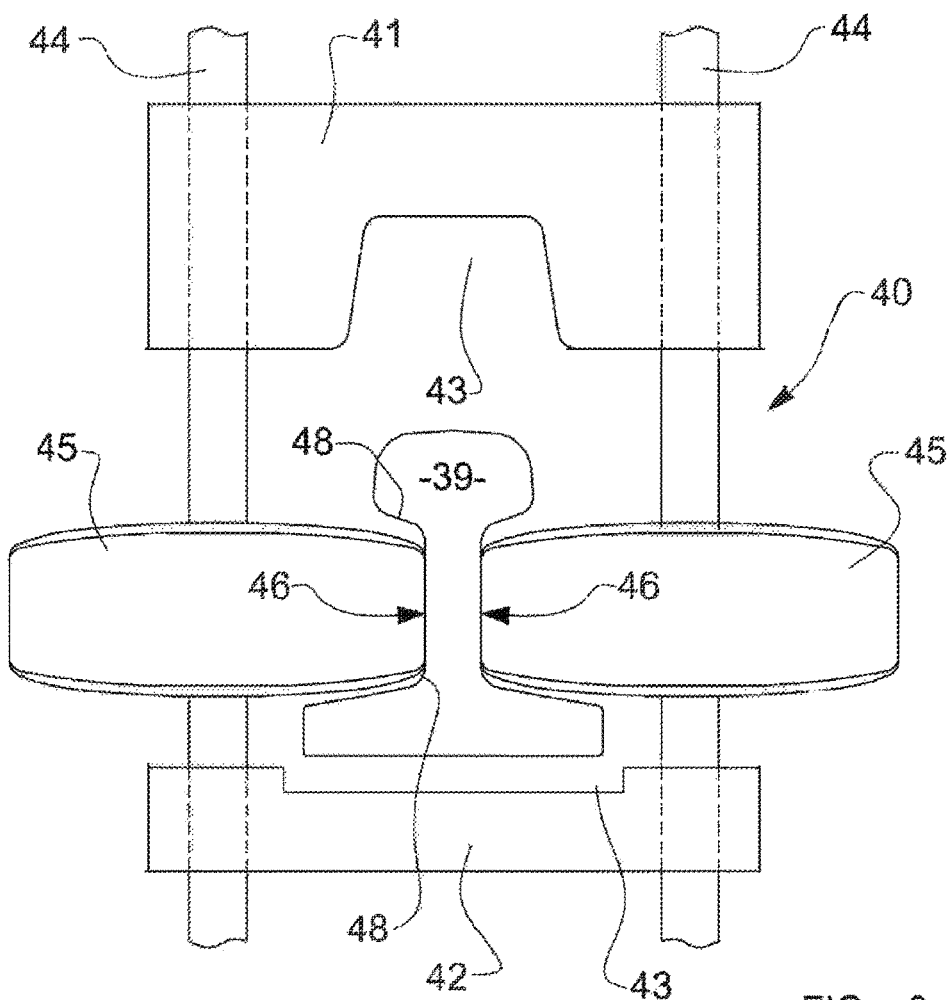
FIG. 9 shows a compression arrangement suitable for use with the present invention.

FIG. 9 is a schematic view of components of a compression arrangement, for applying longitudinal compression to an elongate element, such as a rail section 39, during a welding operation. In FIG. 9 the rail section 39 is shown end-on. The compression arrangement 40 comprises upper and lower grip sections, which take the form of blocks with cut-out sections 43 which are shaped to match the top and bottom of the cross section of the rail section 39.

The upper and lower grip sections 41, 42 are slidably mounted on support rods 44. In the embodiment shown two support rods 44 are provided, one on either side of the rail section 39.

Rotatably mounted on the support rods 44 are grip rollers 45, which in preferred embodiments are formed from a steel, but made be formed from any other suitable material. The profiles of the sides 46 of the grip rollers 45 are generally shaped to match some or all of the sides of the cross-sectional shape of the rail section 39. In particular, the grip rollers 45 are preferably shaped to fit between the "fishing tables" of the rail section 39, which are the angled faces 48 formed where the relatively narrow centre of the rail section flares outwardly at its top and bottom ends.

FIG. 9 shows the compression arrangement 40 in an installation configuration, in which the upper and lower grip sections 41, 42 are separated from one another, so that the compression arrangement 40 may be moved into position around the rail section 39. Once this has been done, the upper and lower grip sections 41, 42 are brought together, so that the top and bottom of the rail section 39 fits into the cut-portions 43 formed in the lower surface of the upper grip section and the top surface of the lower grip section 42.

The grip rollers 45 are then rotated by one or more motors (not shown), to drive the rail section longitudinally in the direction of the puck 16. As the grip rollers 45 will grip the rail section 39, the rail section 39 can be driven into firm engagement with the puck, and maintain in compression, pressed against the surface of the puck 16, as the welding operation continues.

Once the welding operation is complete, the compression arrangement 40 can be removed by separating the upper and lower grip sections 41, 42, and sliding the compression arrangement 40 longitudinally off the free end of the rail section 39.

Figure 10:
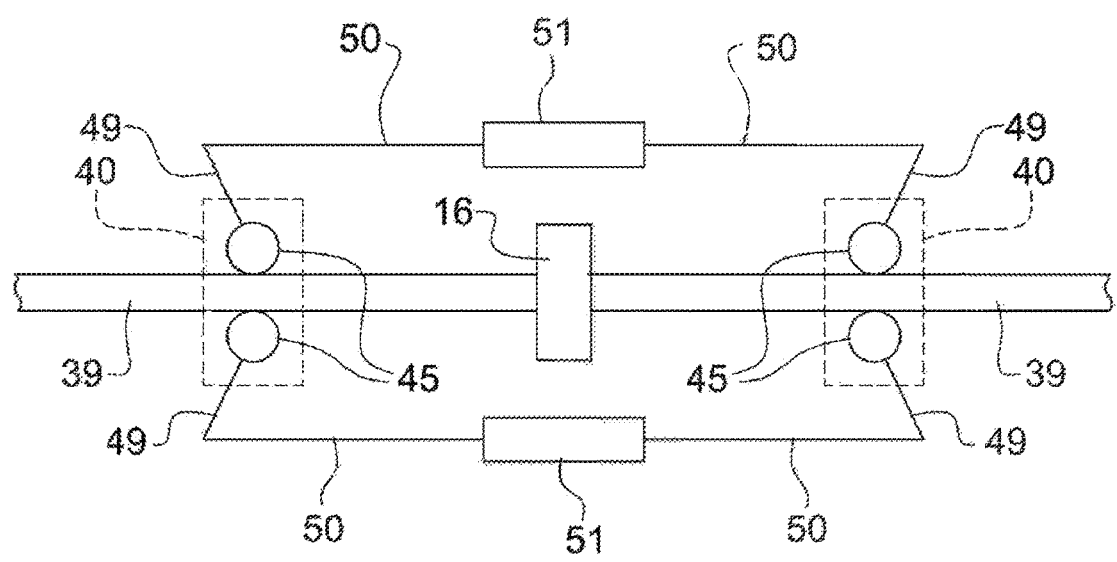
FIG. 10 shows two compression arrangements in use with a welding apparatus embodying the present invention.

FIG. 10 shows an alternative to the grip rollers 45 being rotated by a motor, in which connection arms 49 protrude from outer surfaces of each grip roller 45, and are connected to a drive rod 50 or other linkage. In order to rotate the grip rollers 45, a longitudinal force may be applied to the or each drive rod 50, thus rotating the grip rollers 45. The connection arms 49 may be eccentrically-mounted with respect to each grip roller 45, and/or the grip rollers 45 may themselves be eccentrically mounted for rotation. One effect of this may be that, as the grip rollers 45 are rotated by the connection arms 49 to push the rail 39 towards the puck 16, the grip rollers 45 are urged or biased towards each other, thus exerting a clamping force on the rail 39 so the rail 39 is held firmly between the grip rollers 45, increasing the traction between the rail 39 and the grip rollers 45.

It is envisaged that a pair grip of compression arrangements 40 may be provided on either side of the welding apparatus, one pushing each rail section 39 towards the puck 16.

On either side of the welding apparatus, extending between the compression arrangements 40, a piston 51 is provided. The drive rods 50 connect the pistons 51 to the connection arms 49 which protrude from the grip rollers 45 of each compression arrangement 40. The pistons 51 may be activated to push both drive rods 50 outwardly, or draw both drive rods 50 inwardly, as necessary.

The skilled reader will understand that the compression arrangements 40 described above are known in this technical field.

Once both compression arrangements 40 have gripped the rail sections 39 on either side of the welding apparatus, the pistons may be activated to push the drive rods outwardly, thus rotating the grip rollers 45 so that the rail sections 39 are both pushed inwardly towards to the puck 16. The piston can remain in this state during the welding operation, thus maintaining the rail sections 39 in compression, being pushed firmly towards each other and thus sandwiching the puck 16 between the rail sections 39 as the welding operation continues.

Once the welding operation has been completed, the drive piston may be activated to pull the drive rods outwardly, thus relaxing compression on the rail sections 39 and allowing the two compression arrangements 40 to be removed.

An example of the welding operation using the welding apparatus discussed will now be described.

Initially, one rail section is already in place, and it is envisaged that this rail section may already be welded to other rail sections, forming a part of an incomplete railway line.

A new rail section to be included in the partly-completed line is manoeuvred into place, so that its free end is close to the free end of the existing rail section.

A hole, trench or the like is dug out from the ground immediately around the area where the free ends of the two rail sections meet.

If compression arrangements 40 such as those shown in FIG. 9 are to be used, these compression arrangements may be threaded over the free ends of the two rail sections. Alternatively (and probably more practically) the compression arrangements 40 may be arranged so that they can be fitted around the rail sections and bolted or otherwise fixed together.

The welding apparatus, for instance, as shown in FIG. 8, is then introduced between the two rail sections. The new rail section is brought towards the existing rail section, so that the free ends of the rail sections pass through the apertures formed in the support sleeves 31, and the free ends of the rail sections rest against, or close to, the major opposing surfaces of the puck 16.

The compression arrangements 40 are then activated to drive the rail sections together so that they are pressed firmly against the opposing major surfaces of the puck 16. The welding operation is now to begin.

The rotor 1 is rotated by means of a drive wheel driven by a motor, as discussed above. As this occurs, the support ring 25, and puck 16 supported by the support ring 25, will describe a rotational, orbital motion, and the centre of rotation of the puck 16 will move in a circular manner as this rotation progresses, with the puck 16 being able to rotate freely with respect to the rotor 1.

As will be understood by those skilled in the art, this motion will generate significant quantities of heat, arising from the friction between the free ends of the rail sections and the puck. Once sufficient frictional heat has been generated, rotation is ceased to allow a welded joint to form between the two free-ends of the rail sections and the puck.

As described in, for example, "orbital friction welding as an alternative process for Blisk manufacturing"—Journal of Materials Processing Technology 215 (2015) 189-192, there are understood to be four stages in the friction welding process. In phase 1 ("the initial phase"), the true contact area increases due to asperity wear, leading to heat being generated by solid friction. In a second phase ("the transition phase"), the material softens due to frictional heat, large wear particles are expelled from the surface until the contact period increases up to 100%. Phase 2 ends when the material is no longer able to support the axial load.

In phase 3 ("the equilibrium phrase") the soft material is extruded out of the welding zone under the formation of flash. The layer below the extruded material is plasticised simultaneously and extruded in the next cycle. In this phase, additional heat is generated by breaking and reforming of bonds and plastic deformation.

In the fourth and final phase ("the deceleration phase") the relative motion is stopped. A forging force is applied and the remaining plasticised material is extruded to consolidate the weld and homogenise the microstructure.

The skilled reader will understand how these phases occur during the welding processes described above.

Once the welded joint has cooled sufficiently, the support casing 35, rotor 1 and support rim 25 are broken apart and removed from the weld.

The welded joint is then cleaned by removal of "flash" and other material (including protruding material of the puck 16) that has spread outwardly from the weld zone and extends beyond the profiles of the rail sections. Once this process is finished, the joint between the two rail sections has a substantially continuous cross section along its length.

It will be understood that the puck is "consumed" in this process, in that part of the puck remains as part of the welded joint, within the remainder of the puck being destroyed or discarded.

As a final step, the two compression arrangements 40 are removed, and it may be necessary to thread the two compression arrangements 40 over the free end of the new rail section, although this is likely to be cumbersome and undesirable. Preferably, as mentioned above, the tension arrangements 40 are arranged so that, for example, one or both the upper and lower grip sections 41, 42 can be removed entirely from the support rods 44 (e.g. by being unbolted), thus allowing more straightforward removal of the tension arrangements 40.

The welded joint is then complete, and the process can be repeated with yet a further rail section, welded onto the free end of the new rail section.

Use of the invention is not limited to rail sections, and any suitable elements may be joined together using processes like those described above.

It is envisaged that objects which do not have any elongated for characteristics may be joined together. Alternatively, or in addition, objects which do not have free ends with matching or even similar shapes may be joined together. It is also envisaged that one or both of the objects to be joined may have a free ends with a cross-section comprising one or more separate and non-touching areas. In these embodiments the puck may join discontinuous surfaces and bridge areas which are not connected, and/or which do not have a corresponding opposite element to be joined to.

In the embodiments described above, a support ring 25 is disclosed which rotates within the inner aperture 3 of the rotor 1. However, in some embodiments this support ring may be absent, with the puck being shaped to be supported by, and rotate directly on, the second rollers 23 provided around the inner aperture 3 of the rotor 1. It will be understood that, in such embodiments, the outer edge of the puck may be formed to have a suitable trough shape, to facilitate its support by, and the engagement with, the second rollers 23.

In some embodiments, restraint elements may be provided to maintain the puck in its correct alignment during the welding operation. For instance, sprung rods may be connected to the puck, with the rods each having a length so that they touch, or almost touch, a further component such as one of the support sleeves 31. If the puck starts to move out of the correct alignment during the welding operation, the support rods will contact the support sleeve 31 or other components and prevent further misalignment.

In other embodiments the sprung rods or other restraint elements may be connected to other components, and arrange to touch or almost touch the puck. For instance, blocks (which may be formed from an elastomeric material) may protrude from each major face of the puck 16, and cooperating blocks may also be provided on inner surfaces of the support casing 9, 35. If the puck 16 is correctly aligned the blocks do not touch each other, but if the puck 16 starts to become misaligned (i.e. misaligned outside the allowable tolerances of the apparatus) then the blocks will touch each other, tending to push the puck 16 back towards the correct alignment.

Figure 11A:
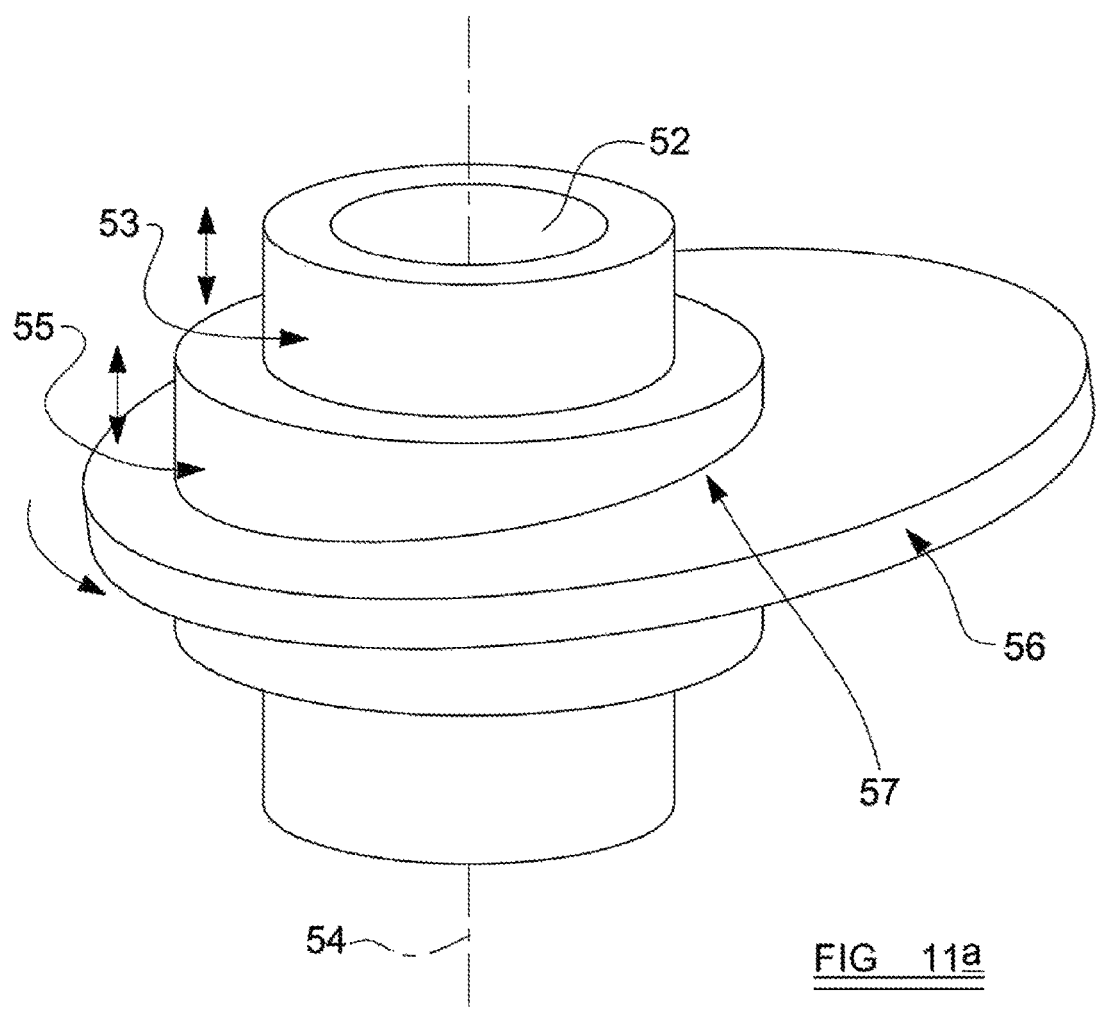
FIGS. 11a and 11b show parts of an alternative welding apparatus embodying the present invention.

A further application of processors involving the present invention may be the joining of turbine blades to a central hub (to form a "blisk"). In techniques such as this, the space around the root of each blade may be limited, as the blades are spaced close together around the perimeter of the hub. FIG. 11*a* shows a schematic view of an embodiment of the invention that is suitable for this kind of welding operation. FIG. 11*a* shows a puck 52 which is cylindrical or generally cylindrical in shape, positioned within a sleeve 53 having an inner cross-sectional shape which is also cylindrical or generally cylindrical in shape. In the embodiment shown, the puck 52 and sleeve 53 are coaxial, sharing a common axis 54. A bearing 55 is attached to, or formed integrally with, the outer surface of the sleeve 53. In this example the bearing 55 is a spherical bearing, having an outer surface which has the shape of part of a sphere.

A rotor 56 is positioned around the bearing 55. The rotor 56 it arranged to rotate around a centre of rotation, and the bearing 55 is received in an aperture 57 in the rotor which is offset with respect to the centre of rotation. The inner surface of the aperture 57 also takes the form of part of a sphere, and the bearing 55 fits closely within the aperture 57.

For the purposes of clarity, no support casing is shown in FIG. 11, although it should be noted that a support casing should be provided in practical embodiments of the invention.

The rotor 56 is, in this embodiment, generally planar, and the plane of the rotor 55 is offset with respect to a plane which is perpendicular to the shared longitudinal axis of the puck 52 and sleeve 53. In preferred embodiments the angle of offset may be 5°-30°.

Figure 11B:
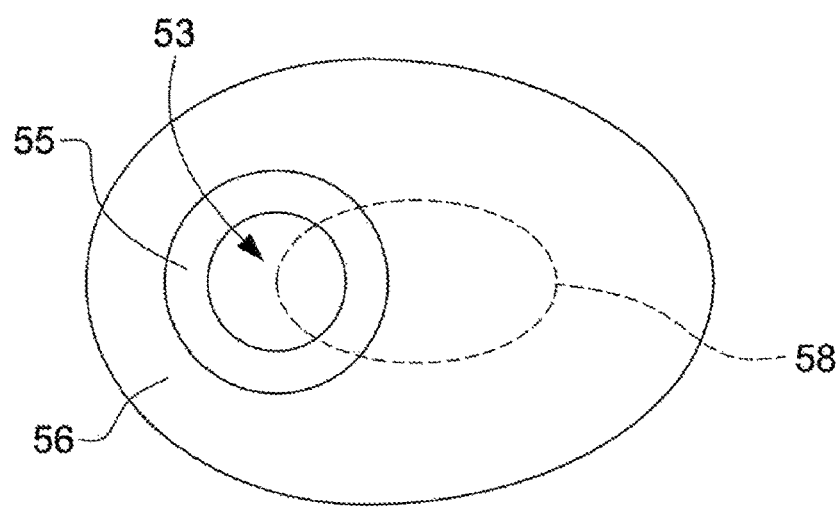

In use of the arrangement shown in FIG. 11, the puck 52 is placed between the outer surface of the hub of the blisk, and the root of a blade which is to be attached to the hub. The rotor 56 is then rotated. As this occurs, the sleeve 53 and puck 52 will move in an orbital motion around the centre of rotation of the rotor 56. FIG. 11*b* shows schematically the path 58 that will be described by the sleeve 53 during rotation of the rotor 56.

In this case, all points being welded would experience a similar welding action to that described above, however the orbital movement of the puck would be elliptical rather than circular.

Alternatively, the plane of the puck-weld interface may be set at an angle to the main axis of the elongated workpieces, and this will produce a "scarf" joint between the workpieces, in which the angle of the join is offset with respect to the workpieces.

As an alternative to the techniques described above, the orbital offset motion of the puck may be produced by connecting the puck to a planetary gear, which rotates around the outside of a central sun gear, or runs around the inside of a ring gear. In the case of a planetary gear which runs around the inside of a ring gear, it is envisaged that the diameter of the planetary gear will be only slightly smaller than the diameter of the ring gear, so that the degree of offset between the centre of rotation in the ring gear and the centre of rotation of the planetary gear is relatively small as a proportion of the diameter of the planetary gear.

As a further alternative, a movable ring or other carriage may be provided, within which the puck is held and is free to rotate, and the ring or carriage is moved in an orbital motion (for instance by moving around a circular track), but does not itself rotate.

In the examples given above, two workpieces are joined together, with the puck being positioned between the workpieces, and allowing the formation of a welded join between the two workpieces at the position of the puck.

However, in other embodiments, a weld may be formed between one workpiece and a puck. In effect, in such operations the puck (or part of the puck) is welded to the single workpiece. Examples of where this may be desirable are internal combustion engine valve stems and valve discs, which are currently welded using friction welding, employing a concentric rotational spinning technique, which is well-known in the art.

Further examples include welding an end plate to a hollow extrusion of aluminium, or one or more discs to the end of elongated elements for the purpose of further machining them into bolted connections. This approach has an advantage over welded end-plate connections, as for a welded connection the fatigue stresses would mean that the weld capacity for a live load would need to be down rated, because of the alignment of the weld across the line of the stresses undergoing cyclical live load stresses.

In this case an end plate welded on in such fashion could achieve significantly higher loading capacity for the same size of connection, or reduce the size for the same load capacity. This may allow further knock-on economies to be achieved, for example through the design of a bridge.

In the examples discussed above, two workpieces are pressed against the opposing major surfaces of the puck, leading to balanced or substantially balanced axial forces. In embodiments where the puck is welded to a single workpiece, the apparatus would be similar, although the components such as the bearings would need to have adequate axial load capacity for a single workpiece to be pressed against one major surface of the puck.

In alternative embodiments, a bracing member (such as a fixture) may be pressed against the opposing major surface of the puck to balance, or partially balance, the axial surfaces during the welding operation. The bracing member may be formed from a material that will not form a welded connection with the puck, and which may simply be removed after the welding operation is complete, leaving the puck welded to the single workpiece. The apparatus required to push the bracing member against the puck may be generally the same as used for the second workpiece in the embodiments described above in which two workpieces are joined together.

The inventor of the devices described above has found that friction welding apparatuses embodying the present invention form particularly effective and reliable welded joints. Without wishing to be bound by theory, these advantages appear to arise from the following. No rotational moment will be transmitted into the puck holder or puck from the rotor or the motor. The puck holder is supported relative to the rotor by a freely rotating bearing. The centre of rotation of the puck holder is eccentric to the centre of rotation of the rotor, an eccentric amount we can call "e". The rotor, due to the eccentricity of the puck relative to the rotor, moves the puck in a circular (note: not rotational) motion about the centre of rotation of the rotor, with radius e. At any point on the circular path, the rotor imparts a tangential force on the puck, with eccentricity e. The friction between the workpiece and the puck interface creates a resisting force which acts at the centre of area of these interfaces. This force is equal to the force imparted by the rotor but opposing. These two equal but opposing forces, with a small distance between them, create a rotational moment. However, the rotational moment of resistance of the interfaces about the puck centre is very high, with which the puck does not experience any significant rotation during the process.

The skilled reader will understand from the discussion above that, while the puck is free to rotate relative to the rotor, during a welding operation it is expected that the puck will not significantly rotate with respect to the workpiece(s) to which the puck has been welded. In the example of a puck being used to weld the free ends of two rails together, where the rails remain substantially stationary with respect to the ground (aside from being moved inwardly towards one another as part of the welding operation), it is expected that the puck will remain generally rotationally stationary with respect to the ground.

In this case, the puck will be rotationally stationary or substantially stationary with respect to the casing within which the rotor rotates, with the rotor rotating between the casing and the puck to drive a circular motion of the puck with respect to the casing.

In some embodiments of the invention, it may be desirable to provide a rotation inhibiting arrangement for the puck, that will actively prevent the puck from rotating with respect to the workpiece(s) during a welding operation. For the avoidance of doubt, it should be noted that the rotation inhibiting arrangement will not prevent the puck from rotating relative to the rotor. Indeed, for the puck to remain stationary or substantially stationary rotationally with respect to the workpiece(s), it is important that the puck is able to rotate with respect to the rotor.

Figure 12:
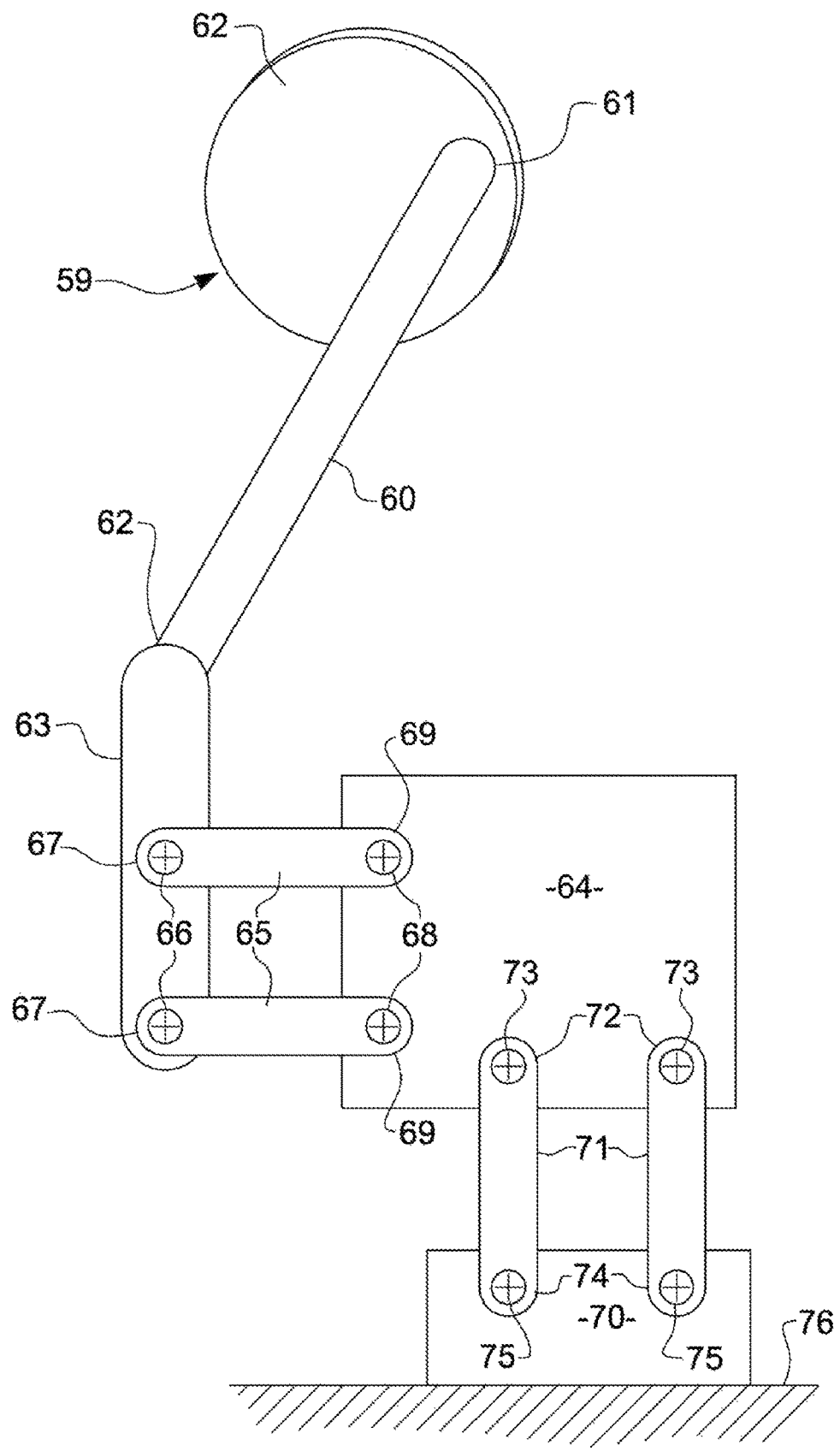
FIGS. 12 and 13 show a rotation inhibiting arrangement suitable for use with the invention.

A schematic view of one possible rotation inhibiting arrangement is shown in FIG. 12. In this figure, only the puck 59 and the components of a first rotation inhibiting arrangement are shown. It should be understood, however, that the puck 59 will form part of a welding apparatus as described above, and will be rotatable within a rotor (not shown).

A retaining bar 60 is generally cylindrical and elongate, and at a first end 61 thereof is attached to a face 62 of the puck 59. The retaining bar 60 is welded to the face 62 of the puck 59 at a location which is spaced apart from the centre of rotation thereof, and preferably which is near or adjacent an outer edge thereof. The skilled reader will understand from this discussion that the attachment of the retaining bar 60 to the puck 59 is to prevent the puck 59 from rotating around its centre point, and therefore attaching the retaining bar 60 to the puck 59 at a position which is significantly spaced apart from its centre of rotation will be advantageous. The retaining bar 60 is attached to the face 62 of the puck 59 so that these two components will not rotate with respect to one another. Preferably, this attachment is formed through welding, although other forms of attachments may also be used.

Preferably, the retaining bar 60 extends in a direction which is substantially parallel with the axis of rotation of the puck 59, i.e. a perpendicular or substantially perpendicular to the plane of the puck 59.

At a second end 62 thereof, the retaining bar 60 is attached to an arm 63. The arm 63 is generally elongate, and in this example is arranged generally vertically. The second end 62 of the retaining bar 60 is attached non-rotatably to the arm 63. In the example shown the retaining bar 60 is attached to the arm 63 nearest to its top end, although this is not essential and the retaining bar 60 may be attached to any point of the arm 63.

The arm 63 is attached to an intermediate connection component 64 by way of first and second parallel or substantially parallel first linkages 65. In the arrangement shown, the intermediate connection component 64 is positioned beside the arm 63, i.e. generally horizontally spaced apart therefrom. Each of the first linkages 65 is preferably elongate, and is attached at a first end 66 thereof to the arm 63 by way of a rotatable connection 67 which allows relative rotation between the linkage 65 and the arm 63. The rotatable connections 67 are vertically or substantially vertically spaced apart from one another. At the second end 67 of each first linkage 65, the linkage 65 is attached to the intermediate connection component 64 by way of a further rotatable connection 69, which once again allows relative rotation between the linkage 65 and the intermediate connection component 64. The further rotatable connections 69 are also vertically or substantially vertically spaced apart from one another.

The first linkages 65 are spaced apart from one another. The skilled reader will understand that the connection between the arm 63 and intermediate connection component 64 formed by the first linkages 65 comprises a parallel linkage, which allows displacement between the arm 63 and the intermediate connection component 64 (in the orientation shown in FIG. 12, vertical or substantially displacement), but retains the relative rotational orientation of the arm 63 in the intermediate connection component 64 with respect to each other.

The intermediate connection component 64 is in turn connected to a base component 70, again by way of a pair of parallel or substantially parallel second linkages 71. The base component 70 is, in the example shown, positioned below the intermediate connection component 64. Each second linkage 71 is attached at a first end 72 to the intermediate connection component 64 by way of a rotatable connection 73. These rotatable connections 73 are horizontally or substantially horizontally spaced apart from each other. At second ends 74 thereof, each second linkage 71 is attached to the base component 70 by way of a further rotatable connection 75, and once again these further rotatable connections 75 are horizontally or substantially horizontally spaced apart from each other.

The skilled reader will again recognise that the intermediate connection component 64 is attached to the base component 70 by way of a further parallel linkage, formed from the two spaced-apart second linkages 71. This will allow relative translational movement (in the example shown in FIG. 12, horizontal or substantially horizontal motion), while maintaining the relative rotational orientation of the base component 70 and intermediate connection component 64.

Preferably the base component 70 is held substantially stationary with respect to the workpiece(s) to which the puck 59 will be welded. In the example shown in FIG. 12, the base component 70 is attached to the ground 76, although the base component 70 may be attached to (or, indeed, be) any other suitable component(s) of the welding apparatus (or of another structure) that will not rotate to the workpiece(s).

The overall effect of the first and parallel linkages as described above is that the arm 63 may move both vertically and horizontally within a plane that is generally parallel with the plane of the puck 59, while remaining rotationally fixed. Substantially vertical movement of the arm 63 is allowed by the first parallel linkage, and a substantially horizontal motion of the arm 63 is allowed by the second parallel linkage.

It will therefore be understood that, as the puck 59 describes a circular motion with respect to the workpiece(s), the arm 63 may also move in a circular motion that generally follows that of the puck 59, and the connection of the puck 59 to the arm 63, by way of the linkage bar 60, will help to ensure that the puck 59 does not rotate with respect to the workpiece(s).

In preferred embodiments the arm 63, the intermediate connection component 64 and the base component 70 all lie in a plane which is offset from the plane of the puck 59. Practically, this is likely to be the most effective way to arrange this kind of rotation inhibiting arrangement, but also this allows the components of the rotation inhibiting arrangement to be placed away from the region in which the welding operation will take place.

The material from which the connection bar 60 is made may need to have a high level of stiffness to prevent rotation of the puck 59 impossible through torsional twisting of the connection bar 60. The connection bar 60 may, for example, be made from EN8 steel. Additionally, the connection bar 60 may be shaped to have a high resistance to torsional twisting, and for instance may take the form of a generally circular rod.

It will be understood that, during a welding operation, it is important that the support bar 60 does not contact or interfere with the workpiece(s) that are being welded to the puck 59. The support bar 60 must therefore be attached to the puck 59 at a location which is outside the expected orbit of the workpiece(s) on the face of the puck 59. In some embodiments it may be necessary to make the puck 59 larger than would otherwise be the case, to allow the attachment of the support bar 60 thereto in a location which will not interfere with the welding operation.

In embodiments where only one workpiece is attached to a face of puck 59, it is preferred that the support bar 60 is attached to the opposite face of the puck 59.

Figure 13:
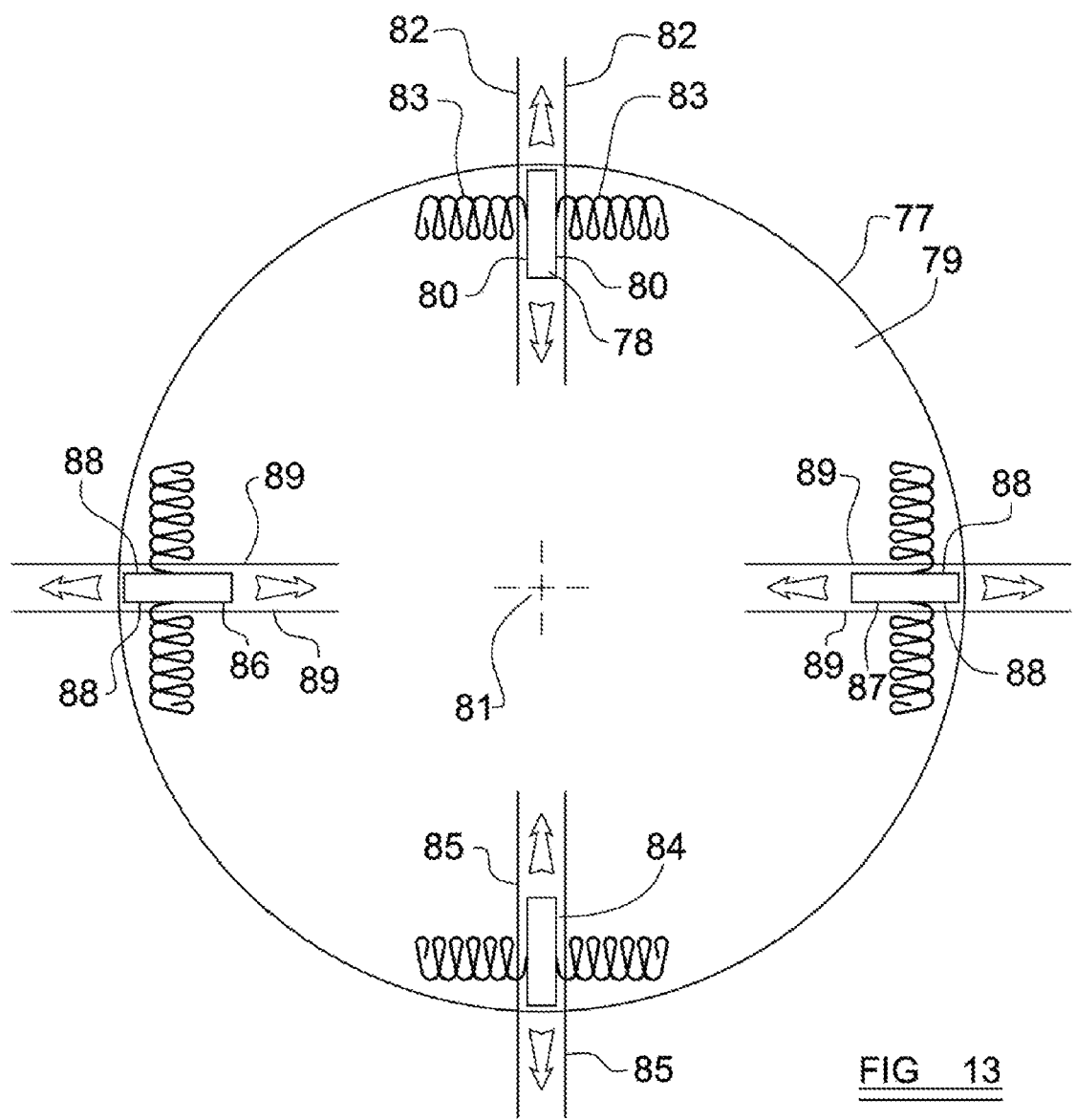

FIG. 13 shows a further rotation inhibiting arrangement. In this embodiment, a puck 77 has four protrusions attached thereto. A first protrusion 78 is attached to a face 79 of the puck 77 at a location near the edge thereof. In the orientation shown in FIG. 13 (which is not essential to the invention), the first protrusion 78 is provided near the top of the puck 77, substantially directly above the centre of rotation 81 thereof. The first protrusion 78 has parallel or substantially parallel opposing faces 80. These faces 80 are both substantially vertically arranged, in the orientation shown in FIG. 13. In other words, the faces 80 face in a direction which is perpendicular or substantially perpendicular to a line joining the first protrusion 78 to the centre of rotation 81 of the puck 77.

The cross-sectional shape of the first protrusion 78 is preferably generally rectangular, with the two faces 80 comprising the long sides of a rectangle. The first protrusion 78 protrudes away from the face 79 of the puck 77, and thus all or a majority thereof is spaced-apart from the plane of the puck 77.

The depth of the first protrusion 78 is preferably around 2.5 cm (i.e. around 1 inch), but this may vary depending on the particular application, and the overall dimensions of the apparatus.

A pair of first sliding plates 82 are positioned on either side of the first protrusion 78, with each of the first sliding plates 82 being parallel, or substantially parallel, with the faces 80 of the first protrusion 78. Each of the sliding plates 82 is arranged so that it can move in a horizontal direction (i.e. in a direction substantially perpendicular to the faces 80 of the first projection 78), as represented by springs 83 shown in FIG. 13. The use of springs is not necessary, however, and any suitable arrangement may be used to allow motion of the sliding plates 82.

In preferred embodiments, the sliding plates 82 are fixed relative to each other, and define a space there between which is the same width as, or slightly wider than, the distance between the faces 80 of the first projection 78. However, this is not essential.

The first projection 78 may slide with respect to the sliding plates 82, in a direction which is substantially parallel with the plates 82 (and with the faces 80 of the first protrusion 78). This motion is represented by arrows which appear in FIG. 13.

A second projection 84 projects from the face 79 of the puck 77 near the bottom thereof. The shape and configuration of the second projection 84 are the same or substantially the same as those of the first projection 78. Once again, the second projection 84 has sliding plates 85 on either side thereof, which may move horizontally. The second projection 84 may once again slide with respect to the sliding plates 85 in a direction which is generally parallel with the plane of the sliding plates 85, i.e. in a direction which is substantially directly towards, or away from, the centre of rotation 81 of the puck 77.

Third and fourth protrusions 86, 87 are provided near the left- and right-hand sides of the puck 77. These third and fourth projections 86, 87 are rotated through 90° with respect to the first and second projections 78, 84, and hence have faces 88 which are substantially horizontal, in the orientation shown in FIG. 13. Once again, sliding plates 89 are provided on either side of each of the third and fourth projections 86, 87, and the sliding plates 89 may move vertically (i.e. in a direction substantially perpendicular to the planes of the sliding plates 89). The third and fourth projections 86, 87 may also slide horizontally (i.e. in a direction which is generally towards, or away from, the centre of rotation 81 of the puck 77) with respect to the sliding plates 89.

In FIG. 13, as in FIG. 12, the puck 77 is shown without the surrounding rotor and other components. However, it is to be understood that the puck 77 will be provided as part of a complete welding apparatus, and in the course of a welding operation will describe a circular motion, as described above.

The sliding plates 82, 85, 89 are supported with respect to the casing of the welding apparatus, or to another component which is substantially fixed in place with respect to the workpiece(s) that are to be welded during the operation.

As the puck 77 describes its circular motion, the ability of the sliding plates 82, 85, 89 to move (in directions which are substantially perpendicular to their planes), will allow the circular motion of the puck 77 to take place without being substantially impeded by the presence of the sliding plates 82, 85, 89.

Also, the fact that each projection 78, 84, 86, 87 can slide within its respective sliding plates 82, 85, 89 will allow the circular motion of the puck 77 to proceed substantially uninhibited. However, the fact that the projections 78, 84, 89 are each positioned between sliding plates 82, 85, 89 which are fixed in orientation means that the puck 77 will be prevented, or substantially prevented, from any rotation occurring during the circular motion.

Once again, this rotation inhibition arrangement will allow the circular motion of the puck during a welding operation, but will prevent rotation of the puck if this occurs. In common with the embodiment discussed above (and shown in FIG. 12), it is important that the projections on the face of the puck do not contact or interfere with the workpiece(s) during a welding operation. Again, the puck may need to be slightly larger than would otherwise be the case, so that the projections (and associated sliding plates) will not contact the workpiece(s) as a welding operation proceeds.

In the arrangement shown in FIG. 13, four projections 78, 84, 86, 87 are provided, spaced evenly apart from one another around the perimeter of one face of the puck 77. However, this arrangement is not essential, and any suitable number of projections, and any suitable arrangement of projections, may also be used. It is also not essential that all of the projections are provided on the same face of the puck. It is expected, however, that at a minimum two projections will be needed, and if only two projections are provided that they should be arranged at right angles or substantially at right angles with respect to each other.

As an alternative, it is envisaged that one or more support rods or other elongate elements may be attached (for instance by welding) to a face of the puck at spaced-apart locations. At their other ends, the support rod(s) may be attached to a structure that will not move or rotate with respect to the workpiece(s). The or each support rod is attached to this structure at a fixed location, but by a flexible connection, which allows some angular movement of the rod with respect to the structure. It is anticipated this will also provide a rotation inhibition arrangement which will allow the circular motion of the puck during a welding operation, but which will prevent rotation thereof as the welding operation proceeds.

Other arrangements for preventing or inhibiting rotation of the puck during a welding operation will be apparent to those skilled in the art, and fall within the scope of the present invention.

Figure 14:
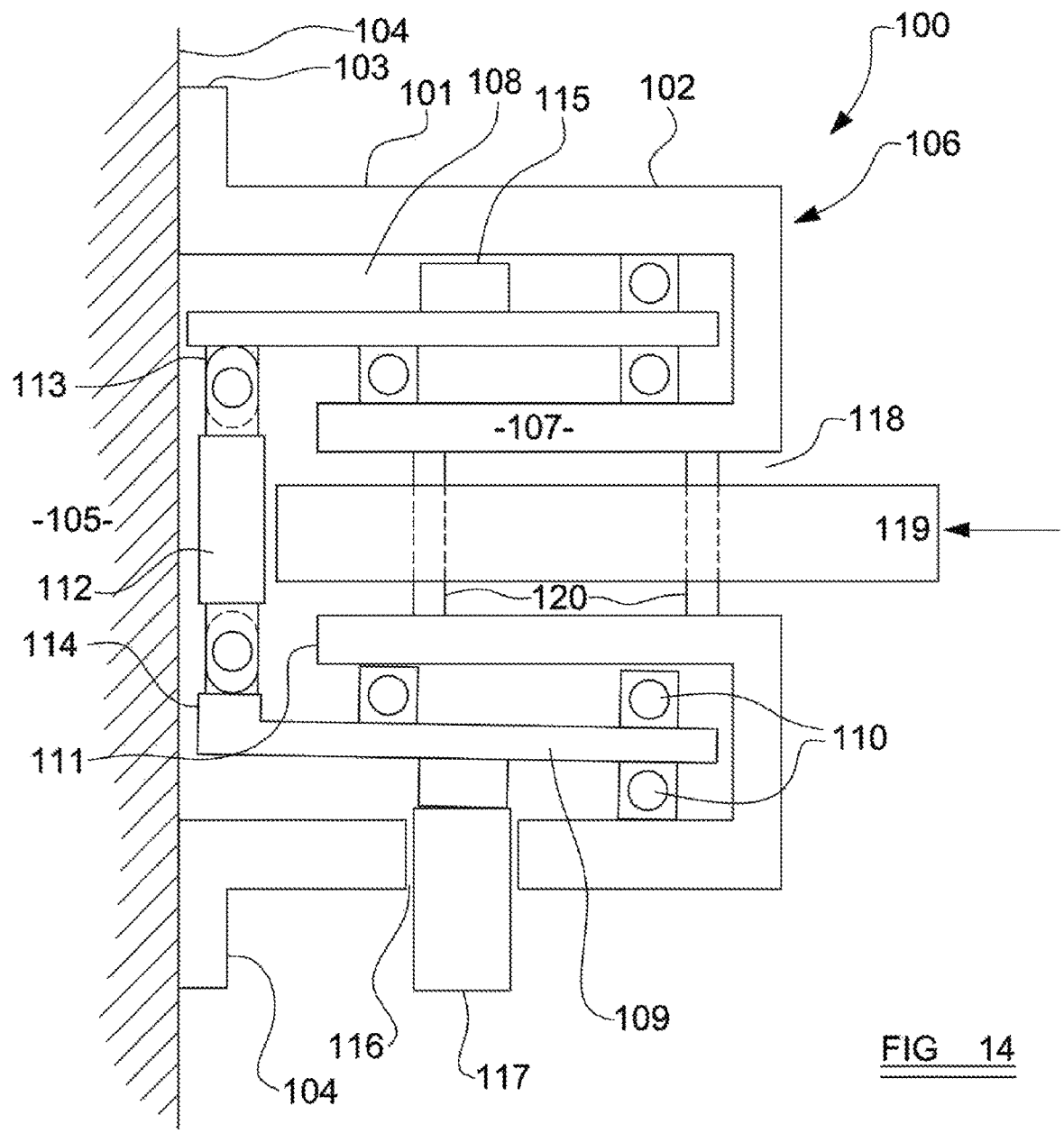
FIG. 14 shows a further welding apparatus embodying the present invention.

FIG. 14 shows a further welding apparatus 100 embodying the present invention. The further welding apparatus 100 is suitable for attaching an elongate workpiece to a relatively wide surface.

FIG. 14 shows a cross-sectional view through the further welding apparatus 100, which is generally cylindrical in overall shape.

The further welding apparatus 100 comprises a casing 101 having an outer section 102 which is generally cylindrical, and has a first end 103 that is adapted to be attached to a face surface 104 of a large workpiece 105. In the example shown, the face surface 104 of the large workpiece has an area which is at least as large as the cross-sectional area of the casing 101. At the first end 103 the first section 102 may have one or more connection features, such as an outwardly-protruding flange 104, to assist with connection of the casing 101 to the workpiece 105. The casing 101 may be attached to the workpiece 105 by clamps or other suitable means.

At its second end 106, the casing 101 is shaped to turn inwardly and back on itself to form an inner section 107, which is once again generally cylindrical and lies within the outer section 102. The inner section 107 is shorter than the outer section 102, and does not extend as far as the first end 103 thereof.

A generally cylindrically-shaped space 108 exists between the inner and outer sections 102, 107 of the casing 101.

Positioned within the space 108 is a rotor 109, which has a generally cylindrical form. The rotor 109 is rotatably supported with respect to the casing 101 by a series of bearings 110, which may take any suitable form.

The rotor 109 protrudes beyond the second end 103 of the inner section 107 of the casing 102. A generally disc-shaped consumable element or puck 112 is rotatably supported by the rotor 109, and is held in a position which is generally level with the first end 103 of the casing 102. It will be understood that, when the first end 103 of the casing 101 is clamped against the workpiece 105, the puck 112 will also lie against the face 104 of the workpiece 105.

The puck 112 is rotatably held with respect to the rotor 109 by bearings 113, which may take any suitable form.

The puck 112 is held in a manner that is off-centre with respect to the rotor 109, as has been discussed above in connection with other embodiments. In the example shown at FIG. 14, this is achieved by including an inward protrusion 114 on one side of the rotor 119, so the puck 112 is held closer to one side of the rotor 109 than the other. However, any suitable technique may be used to hold the puck 112 in an off-centre manner.

A driven gear 115 is formed on the outer surface of the rotor 109, and fits within the space 108 between the inner and outer sections 102, 107 of the casing 101. The outer section 102 of the casing 101 includes a break 116 therein, and a driven gear 117 protrudes through the gap 116 to engage with the driven gear 115 of the rotor 109. It will therefore be understood that the rotor 109 may be driven to rotate within the casing 101.

The inner section 107 of the casing 101 is, as discussed above, generally cylindrical, and defines central space 118 therethrough. A generally elongate workpiece 119 passes through the central space 118, and is held in position by a pair of spaced apart guide plates 120 which are held within central space 118. The guide plates 120 have apertures formed therethrough which generally correspond to the outer profile of the workpiece 119, and therefore allow the workpiece 119 to slide longitudinally with respect to the casing 101, but not to rotate with respect to the casing 101. However, any guide arrangement may be used to maintain the workpiece 119 in suitable alignment (including guide arrangements that allow the workpiece to rotate), and the invention is not limited to guide plates 120 of this kind.

In order to join the relatively large work piece 105 to the elongate work piece 119, the rotor 109 is rotated, to cause the puck 112 to describe a circular motion with respect to the surface 104 of the large workpiece 105. The elongate workpiece 119 is then advanced through the guide plates 120 to be driven against the other surface of the puck 112. As has been discussed above in connection with other embodiments, a weld will be formed between the two workpieces 105, 119, with the puck 112 forming part of this welded joint.

Once the weld is complete, the casing 101 may be unclamped from the large workpiece 105 and withdrawn, along with the rotor 109, leaving the workpieces 105 welded together.

Embodiments of this kind may be used, for example, in the welding of a blade (such as a turbine blade) to a hub.

A further application of techniques embodying the present invention is in the field of friction surfacing. A friction surfacing is a process in which the free end of a rod composed of a coating material is pressed against a surface and rotated. At the interface between the surface and the free end of the rod, a plasticised layer (as discussed above) is generated. If the rod is moved with respect to the surface (or the surface is moved with respect to the rod) as this occurs, a layer of the coating material is deposited on the surface. The rod is generally consumed as this process occurs.

In embodiments of the invention, an arrangement is provided in which an elongate rod is supported with respect to a surface, within a rotor having an off-centre aperture therethrough, which may be driven to rotate with respect to the surface. As this occurs, the rod will describe a circular motion, as has been discussed above in connection with other embodiments. The rotor is rotated, and the rod is simultaneously driven towards the surface, in order to initiate a friction surfacing operation. The rod and surface are moved in a translational manner relative to each other, so that the point of interface between the rod and the surface moves with respect to the surface, thus depositing a coating by friction surfacing.

Figure 15:
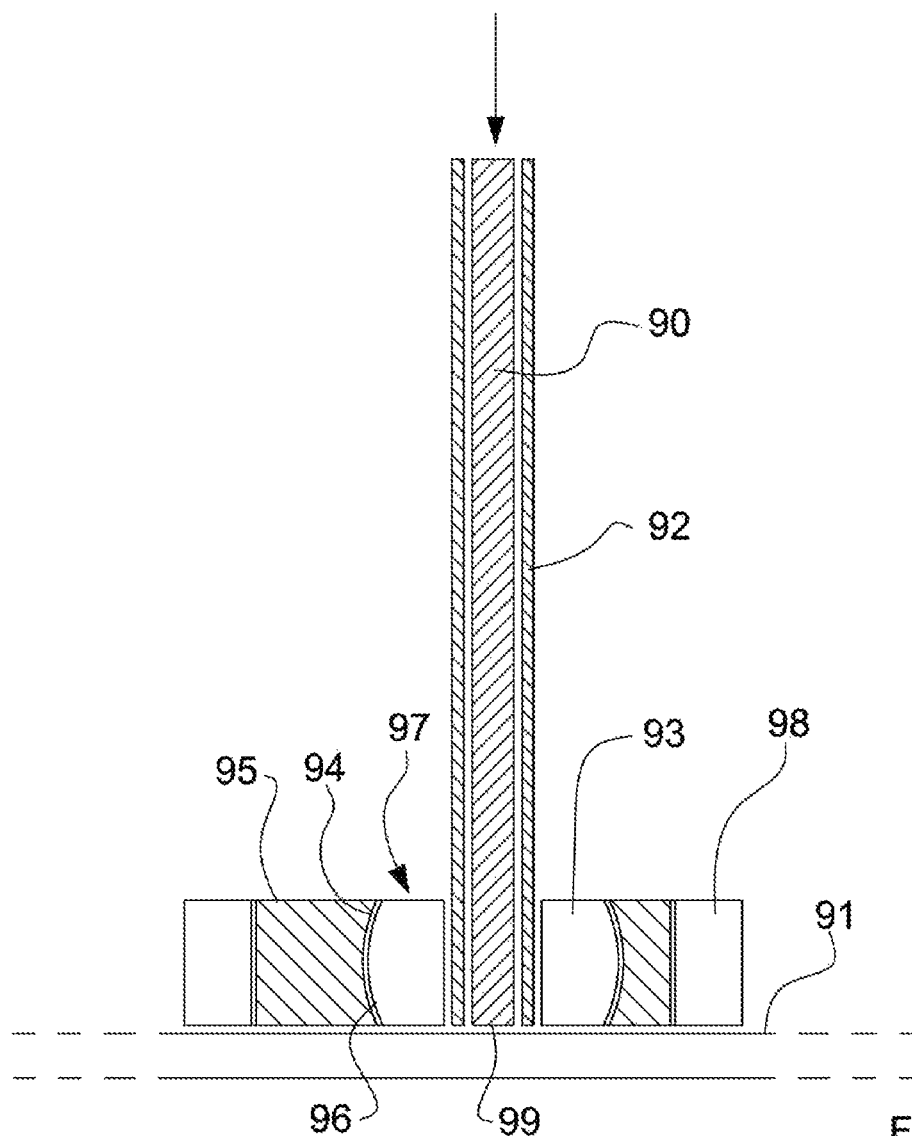
FIGS. 15 and 16 show a friction surfacing apparatus embodying the present invention.

An embodiment of this type is shown schematically in FIG. 15. FIG. 15 shows a rod 90 of a consumable material, as discussed above. In the orientation shown in FIG. 15 the rod 90 is arranged in a substantially vertical fashion, and some of the material of the rod 90 is to be deposited on to a surface 91 which is substantially horizontal. However, these orientations are not necessary, and indeed it is not essential for the rod to be oriented at right angles to the surface.

The rod 90 is held within a sleeve 92 which is preferable close-fitting around the rod 90. The rod 90 may slide axially with respect to the sleeve 92, so that it may be driven downwardly on to a surface 91 as the welding operation proceeds.

At or near an end of the sleeve 92 which is close to the surface 91, the sleeve 92 is received within a spherical bearing 93, which has a general circular aperture formed through its centre and a part-spherical outer surface 94.

The spherical bearing 93 is rotatably mounted within a rotor 95, which has an aperture 97 formed therethrough in which the spherical bearing 93 is received. The aperture 97 is offset with respect to the centre of the rotor 95. The degree of offset is exaggerated in FIG. 15 for the purposes of clarity.

The inner surfaces 96 of the aperture 97 are curved so as to match or substantially match the outer profile of the spherical bearing 93.

It will be understood that the spherical bearing 93 may rotate around the axis of the rod 90 with respect to the rotor 95. Moreover, the fact that the rod 90 and its housing 92 are mounted within a spherical bearing 93 means that some angular "play" of the rod 90 may occur with respect to the rotor 95. In other embodiments, however, the spherical bearing 93 may be dispensed with, and the housing 92 may be directly rotatably mounted within an aperture of the rotor 95, with no spherical surfaces being provided.

The rotor 95 is mounted within a housing 98, and is rotatable with respect thereto around an axis which is preferably parallel or substantially parallel with the axis of the rod 90.

The rotor 95 may be driven to rotate with respect to the housing 98.

Figure 16:
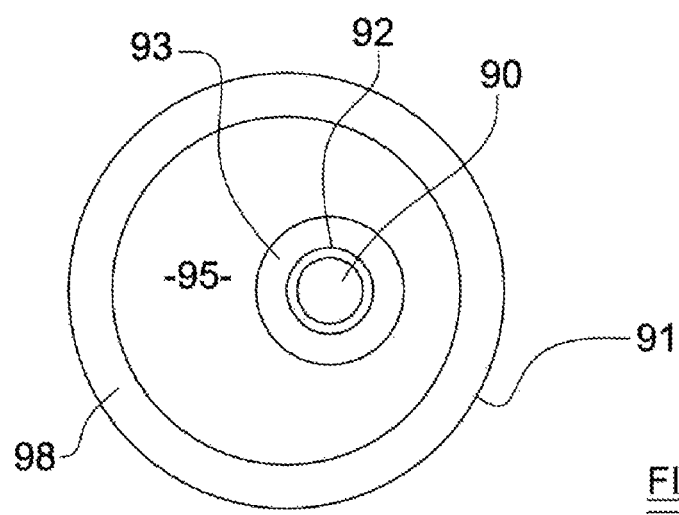

In the example shown, the spherical bearing 93, the rotor 95 and the housing 98 are generally arranged in a planar configuration, which is spaced apart from the surface 91. A top view of the arrangement of FIG. 15 is shown in FIG. 16.

It will be understood that, as the rotor 95 is driven to rotate with respect to the housing 98, the rod 90 (along with the housing 92 and spherical bearing 93) will be driven to describe a circular motion, similar to the motions described above in relation to other embodiments. As this occurs, a welding process will occur at the interface of the free end 99 of the rod 90 and the surface 91.

To carry out a friction surfacing operation, continuous downward force on the rod 90 may be exerted, and the casing 98, rotor 95, spherical bearing 93, casing 92 and rod 90 may be translated with respect to the surface 91 as one unit, thus depositing a layer, on the surface 91, of the material of the rod 90. Alternatively, the casing 98, rotor 95, spherical bearing 93, casing 92 and rod 90 may remain stationary while the surface is translated.

In order for the friction surfacing operation to be carried out, it will be necessary to provide an alignment arrangement, to maintain suitable relative positioning between the surface and the components of the welding apparatus.

An arrangement similar to that shown in FIGS. 15 and 16 may also be used for joining two elements, for instance generally plate-like elements, together. In a plate-joining operation, two plates or similar elements (or elements that have at least one plate-like part) are provided, where the elements have edges that are of corresponding or complementary shape, so the edges can be placed together with little or no gap therebetween. A simple example is two plates with straight edges, that can be abutted against each other. This situation is shown schematically in FIG. 17*a*, where two plates 121, 122 having corresponding straight edges 123, 124 are abutted together. The size of the gap between the edges 123, 124 is exaggerated in FIG. 17*a* for the purposes of clarity.

An apparatus such as the one shown in FIGS. 15 and 16 may then be used to apply a welding operation to the region where the two edges 123, 124 meet each other. The rod 90 is shown in FIG. 17*a*, although the remaining components of the welding apparatus are omitted for the sake of clarity. It can be seen that the free end 99 of the rod 90 straddles the edges 123, 124 of the two plates 121, 122, and covers the region where the edges 123, 124 meet.

As the welding operation proceeds, the rod 90 and/or the plates 121, 122 may be moved so that the point where the end 99 of the rod 90 meets the plates 121, 122 travels along at least some of the length of the line where the two edges 123, 124 meet each other.

As the skilled reader will understand, this operation may result in a welded joint between the two edges.

As an alternative, each plate 121, 122 may have a section of reduced width at its edge 123, 124, to form a dip 125 into which the free end 99 of the rod 90 may be inserted during the welding operation. This is shown in FIG. 17*b*. It is expected that this is likely to result in a neater welded joint, which fits within or substantially within the profile of the depth of the plates 121, 122.

In the examples shown in FIGS. 17*a* and 17*b*, the rod 90 is oriented exactly or substantially at right-angles with respect to the planes of the plates 121, 122. However, in either of these examples, the rod 90 may be set at an angle to the planes of the plates 121, 122.

FIG. 17c shows a further example, in which the rod 90 is set at an angle of around 45° to the planes of the plates 121, 122. In this example, each plate 121, 122 has an angled portion 126 at its edge 123,124, which is set at an angle of around 45° to the planes of the plates 121, 122, so each plate 121, 122 tapers towards its edge 123, 124. These angled portions 126 fit together to form an angled dip in the region where the two plates 121, 122 meet each other, with the angle at the bottom of the dip being around 90°.

The free end 99 of the rod 90 is (at least initially) generally flat, so the free end 99 has a generally squared profile, when seen from the side. The free end 99 of the rod 90 will therefore fit into the dip.

In a welding process of this embodiment, the free end 99 of the rod 90 is inserted into the dip, and the welding process is then carried out in a similar manner to the process described above in connection with FIGS. 17a and 17b.

In these examples the attachment faces of the two plates may be considered to be the parts of the surfaces of the plates which are contacted by the free end of the rod, i.e. regions of the upper surfaces of the plates, rather than the surfaces of the plates which abut directly against one another.

The embodiments shown in FIGS. 17a-17c are examples of butt welding. FIG. 17d show an example of fillet welding embodying the present invention. In FIG. 17d two plates 127, 128 are arranged at right angles with respect to each other, and the free end 99 of the rod 90 is arranged to contact the plates 127, 128 where the plates 127, 128 meet each other, i.e. at their internal angle. Once again, the welding operation is initiated, and the rod 90 and/or plates 127, 128 are moved so that the free end 99 of the rod 90 moves along the line where the plates 127, 128 meet each other. The result will be a welded joint between the plates 127, 128, as will be understood by the skilled reader.

While the free end 99 of the rod 90 is shown as being flat in FIG. 17d, the end may be (for example) conical, having sides set at 45° to the axis of the rod 90, so that it fits more completely against the plates 127, 128.

Once again, in this embodiment the attachment faces of the two plates may be considered to be the parts of the surfaces of the plates which are contacted by the free end of the rod, i.e. exposed regions of the surfaces of the plates the right-angle join, rather than the surfaces of the plates which abut directly against one another.

The skilled reader will understand that embodiments of the present invention may be used to form other kinds of welded joints, such as lap joints, edge joints, and joints between plates which meet at an acute or obtuse angle.

It will be appreciated that arrangements embodying the present invention may allow the rapid and efficient formation of strong and reliable welded joints.

When used in this specification and claims, the terms "comprises" and "comprising" and variations thereof mean that the specified features, steps or integers are included. The terms are not to be interpreted to exclude the presence of other features, steps or features.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An apparatus for forming a friction weld between first and second workpieces, the apparatus comprising:
a support arrangement;
a holding member, which is supported by the supporting arrangement, and which may be driven to rotate with respect thereto, or move with respect thereto along an arcuate path;
a consumable element having first and second joining faces, the consumable element being mounted in a mounting location on the holding member so that the first and second joining faces are exposed, wherein the consumable element is rotatable with respect to the holding member about a first center of rotation, and wherein when the holding member is driven to rotate or move with respect to the support arrangement, the first center of rotation travels in an orbital motion with respect to the support arrangement; and
first and second alignment arrangements, positioned to hold the first and second workpieces respectively in place so that attachment faces of the first and second workpieces are aligned with the respective first and second joining faces of the consumable element.

2. An apparatus according to claim 1, wherein the holding member comprises a rotor which may be driven to rotate around a second center of rotation.

3. An apparatus according to claim 2, wherein the mounting location comprises an aperture formed through the rotor, in which the consumable element is rotatably mounted, with the second center of rotation being offset with respect to the first center of the rotation.

4. An apparatus according to claim 2, wherein the consumable element is mounted within a support ring, which is rotatably mounted in the mounting location.

5. An apparatus according to claim 4, wherein the support ring has an inner surface which is set at a first angle with respect to the axis of rotation thereof, and the consumable element has an outer rim which is offset at a second angle with respect to the axis of rotation thereof.

6. An apparatus according to claim 2, wherein the rotor is arranged to be driven rotationally by a drive arrangement.

7. An apparatus according to claim 1, wherein the support arrangement comprises a ring gear, and the holding member comprises a planetary gear which is driven to engage the ring gear and rotate around an inner surface of the ring gear.

8. An apparatus according to claim 1, wherein the first alignment arrangement comprises a sleeve element having an aperture formed therethrough through which the first workpiece may be inserted, and wherein the sleeve element is held in position with respect to the support arrangement.

9. An apparatus according to claim 6, wherein the sleeve element is held spatially in position with respect to the support arrangement so that the workpiece may not move in a radial direction with respect to the consumable element.

10. An apparatus according to claim 1, further comprising a tension arrangement for driving the first workpiece towards the consumable element.

11. An apparatus according to claim 1, further comprising a rotation inhibiting arrangement which is operable to prevent or inhibit rotation of the consumable element with respect to the first workpiece.

12. An apparatus according to claim 11, wherein the rotation inhibiting arrangement comprises one or more projections that protrude from a face of the consumable element, and which may slide with respect to a retaining arrangement that substantially does not rotate with respect to the first workpiece.

13. An apparatus according to claim 1, wherein the first alignment arrangement is adapted to attach the apparatus to a face of a workpiece having an area that is at least as great as the cross-sectional area of the support arrangement.

14. An apparatus according to claim 1, wherein the apparatus is a friction surfacing apparatus and:
the consumable element is elongate;
the first workpiece comprises a surface onto which material from the consumable element is to be deposited;
a drive arrangement is provided to apply a force to the consumable element to drive the consumable element towards the surface; and
a translation arrangement is provided to cause relative translational movement between the consumable element and the surface.

15. An apparatus according to claim 1, comprising:
the consumable element is elongate;
the alignment arrangement holds the first and second workpieces adjacent one another, so that the consumable element is aligned with a region where the first and second workpieces meet one another;
a drive arrangement is provided to apply a force to the consumable element to drive the consumable element towards the region where the first and second workpieces meet one another; and
a translation arrangement is provided to cause relative translational movement between the consumable element and the region where the first and second workpieces meet one another.

16. A method for forming a welded joint between first and second workpieces, the method comprising:
providing a consumable element having first and second joining faces;
mounting the consumable element in a mounting location of a holding member so that the first and second joining faces are exposed, wherein the consumable element is rotatable with respect to the holding member about a first center of rotation;
providing first and second workpieces, each having an attachment face;
aligning the attachment faces of the first and second workpieces with the respective first and second joining faces of the consumable element; and
rotating the holding member, or moving the holding member along an arcuate path, so that the first center of rotation travels in an orbital motion, thus generating frictional forces between the attachment faces of the first and second workpieces and the first and second joining faces of the consumable element.

* * * * *